United States Patent [19]

Soga et al.

[11] Patent Number: 4,867,732
[45] Date of Patent: Sep. 19, 1989

[54] CONTROL DEVICE FOR BELT-AND-PULLEY TYPE CONTINUOUSLY VARIABLE TRANSMISSION FOR A VEHICLE

[75] Inventors: Yoshinobu Soga; Katsumi Kouno; Masami Sugaya, all of Susono; Susumu Okawa, Aichi, all of Japan

[73] Assignee: Toyota Jidosha Kabushiki Kaisha, Japan

[21] Appl. No.: 232,666

[22] Filed: Aug. 16, 1988

[30] Foreign Application Priority Data

Aug. 21, 1987 [JP] Japan .................. 62-208791
Aug. 21, 1987 [JP] Japan .................. 62-208792

[51] Int. Cl.$^4$ ............................ F16H 11/02
[52] U.S. Cl. ............................ 474/28; 74/866
[58] Field of Search ............ 474/18, 28, 69, 70; 74/866–869

[56] References Cited

U.S. PATENT DOCUMENTS

| | | | |
|---|---|---|---|
| 4,152,947 | 5/1979 | van Deursen et al. | 474/28 X |
| 4,557,706 | 12/1985 | Tanaka et al. | 474/28 |
| 4,663,990 | 5/1987 | Itoh et al. | 74/866 |
| 4,663,991 | 5/1987 | Nakamura et al. | 474/28 X |
| 4,704,683 | 11/1987 | Osanai | 74/866 X |
| 4,772,249 | 9/1988 | Kouno et al. | 474/28 |

FOREIGN PATENT DOCUMENTS 52-98861 8/1977 Japan .

Primary Examiner—Thuy M. Bui
Attorney, Agent, or Firm—Oliff & Berridge

[57] ABSTRACT

A hydraulic control device for controlling a belt-and-pulley type continuously variable transmission for an automotive vehicle which includes an input and an output shaft, a pair of variable-diameter pulleys provided on the input and output shafts, respectively, a transmission belt connecting the pair of pulleys, and a pair of hydraulic actuators for changing effective diameters of the variable-diameter pulleys. The hydraulic control device further includes a shift control valve device for controlling pressures applied to the hydraulic actuators, to change the speed ratio of the continuously variable transmission over a mechanically defined range, and a controller for applying a drive signal to the shift control valve device. The controller includes a device for limiting a value of the drive signal, so as to prevent the actual speed ratio of the transmission from reaching upper and lower limits of the mechanically defined range.

8 Claims, 12 Drawing Sheets

FIG.8
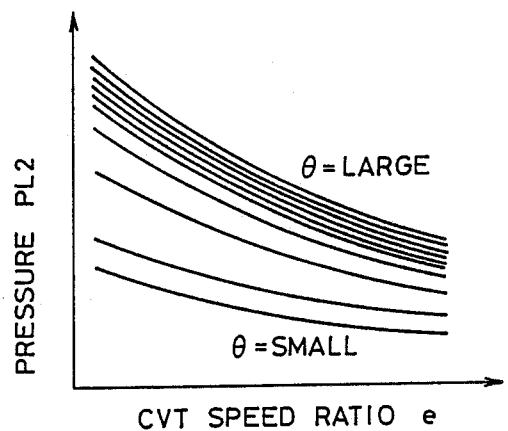
FIG.10
| 1ST SOL. VALVE 272 | 2ND SOL. VALVE 290 | SHIFT MOTIONS OF CVT 16 |
|---|---|---|
| ON | OFF | SLOW SHIFT-UP |
| ON | DUTY CYCLE | INTERMEDIATE SHIFT-UP |
| ON | ON | FAST SHIFT-UP |
| OFF | OFF | SLOW SHIFT-DOWN |
| OFF | DUTY CYCLE | INTERMEDIATE SHIFT-DOWN |
| OFF | ON | FAST SHIFT-DOWN |
FIG.11
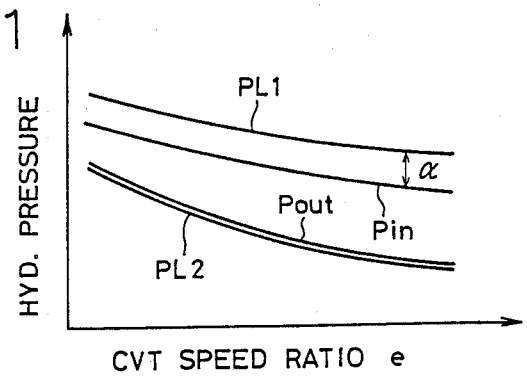

CONTROL DEVICE FOR BELT-AND-PULLEY TYPE CONTINUOUSLY VARIABLE TRANSMISSION FOR A VEHICLE

BACKGROUND OF THE INVENTION

1. Field of the Invention

The present invention relates to improvements in a hydraulic control device for controlling a continuously variable transmission of a belt-and-pulley type for an automotive vehicle.

2. Discussion of the Prior Art

There is known a belt-and-pulley type continuously variable transmission for a motor vehicle which includes a pair of variable-diameter pulleys provided on a first and a second rotating shaft, respectively, a transmission belt which connects the pair of pulleys to transmit power from one of the first and second shafts to the other, a first and a second hydraulic actuator for changing effective diameters of the respective variable-diameter pulleys, and a shift control valve device for controlling flows of a working fluid into and from said hydraulic actuators, to change the speed ratio of the continuously variable transmission. An example of such a belt-and-pulley type continuously variable transmission is disclosed in laid-open Publication No. 52-98861 (published in 1977) of unexamined Japanese Patent Application.

An example of a hydraulic control device for controlling the speed ratio of the above-indicated type of continuously variable transmission uses a shift control valve device, which is electrically driven or controlled by a suitable electric controller to change the speed ratio of the transmission as needed. For instance, the electric controller applies a controlled drive signal to the shift control valve device such that the actual speed ratio of the transmission or the actual speed of its input shaft coincides with a determined target or desired value.

In the belt-and-pulley type continuously variable transmission, the range in which the speed ratio can be varied is determined, for example, by a maximum distance of movement of axially movable rotors of the variable-diameter pulleys, which in turn determins a maximum amount of change in the width of V-grooves of the pulleys which determines an effective diameter of the pulleys. In other words, the range of the speed ratio of the transmission is mechanically defined or determined. On the other hand, the controller may determine a target speed ratio which is outside the mechanically defined range. In this case, the shift control valve device is commanded to apply the line pressure to the hydraulic actuator on the drive or driven side, even after the actual speed ratio reaches the upper or lower limit of the mechanically defined range, in order to establish the determined target speed ratio, or so that the actual speed ratio coincides with the determined target value. In this case, the pressure in one of the two hydraulic actuators rises to a level higher than that required to establish the maximum or minimum speed ratio. Accordingly, a hydraulic power source in the form of an oil pump suffers from a power losss, and the transmission belt tends to be deteriorated due to an excessive tension. In the case where the hydraulic control device is adapted such that the line pressure is regulated by a pressure regulating valve based on the pressure in the hydraulic actuator, the pressure regulating valve raises the line pressure to a level higher than the pressure in the hydraulic actuator, when the ine pressure becomes equal to the pressure in the hydraulic actuator. That is, the line pressure may be raised to an unnecessarily high level. In this case, the problems such as the hydraulic power loss and deterioration of the belt as indicated above are aggravated.

SUMMARY OF THE INVENTION

It is accordingly an object of the present invention to provide a hydraulic control device for controlling a belt-and-pulley type continuously variable transmission for an automotive vehicle, which has provisions for preventing the speed ratio of the transmission from reaching an upper or lower limit of the mechanically defined range, and for thereby avoiding a rise of the line pressure to an unnecessarily high level.

The above object may be achieved according to the principle of the present invention, which provides a hydraulic control device for controlling a belt-and-pulley type continuously variable transmission for an automotive vehicle which includes an input and an output shaft, a pair of variable-diameter pulleys provided on the input and output shafts, respectively, a transmission belt connecting the pair of pulleys, and a pair of hydraulic actuators for changing effective diameters of the variable-diameter pulleys, the hydraulic control device comprising: a shift control valve device for controlling pressures applied to the hydraulic actuators, to change an actual speed ratio of the continuously variable transmission over a mechanically defined range; and control means for applying a drive signal to the shift control valve device. The control means includes limiting means for limiting a value of the drive signal, so as to prevent the actual speed ratio of the transmission from reaching upper and lower limits of the mechanically defined range.

In the hydraulic control device of the present invention constructed as described above, the drive signal applied to the shift control valve is limited by the limiting means, when needed, so that the actual speed ratio of the transmission is always held within the mechanically determined range. Namely, the actual speed ratio will not reach the upper or lower limit of the mechanically defined range. Thus, the instant hydraulic control device avoids an otherwise possible unnecessary rise of the hydraulic actuator pressure, and is therefore capable of eliminating the conventionally encountered problems such as increased power loss of an oil pump of the hydraulic system or shortened service life of the transmission belt.

In one preferred form of the present invention, the control means further includes speed-ratio control means for controlling the actual speed ratio of the transmission such that the actual speed ratio or an actual speed of the input shaft of the transmission coincides with a target value, and determining means for determining the target value according to a predetermined relationship. In this case, the limiting means is adapted to limit the determined target value to an upper or lower control limit of a predetermined permissible control range of the target value, if the determined target value is higher than the upper control limit or lower than the lower control limit. In the instant form of the invention, the target speed ratio which determines the drive signal applied to the shift control valve always falls within the predetermined permissible control range, so that the actual speed ratio will not reach the upper or lower limit of the mechanically defined range, whereby an unnecessary rise of the hydraulic actuator pressure is avoided.

In another preferred form of the invention, the hydraulic control device further comprises a hydraulically operated pressure regulating valve which adjusts a line pressure based on a higher one of pressures in the pair of hydraulic actuators. In this case, the limiting means is effective to avoid an unnecessary rise of the line pressure which would occur if the actual speed ratio reaches the upper or lower limit of the mechanically defined range.

Alternatively, the hydraulic control device further comprises a pressure regulating servo valve which is electrically controlled based on a signal representative of a control error between the actual speed ratio and a target speed ratio of the transmission.

In a further preferred form of the present invention, the control means further includes detecting means for detecting the upper and lower limits of the mechanically defined range of the actual speed ratio of the transmission. In this case, the value of the drive signal to be applied to the shift control valve may be limited so that the actual speed ratio of the transmission may be changed to points close to the detected upper and lower limits of the mechanically defined range. Thus, the rise of the hydraulic actuator pressure to an unnecessarily high level is avoided. Further, the actual speed ratio can be changed over a comparatively wide range almost equal to the entire mechanically defined range, even if the mechanically defined range is expanded during a long period of use of the transmission, or even if the mechanically defined range differs from one transmission to another. The range in which the speed ratio "e" is permitted to be changed would be narrow if a considerably narrow permissible control range of the speed ratio is used to prevent the actual speed ratio from reaching the upper and lower limits of the mechanically defined range, which may differ on the individual transmissions or which may be changed during use of the transmission.

In one arrangement of the above form of the invention, the detecting means determines the upper and lower limits of the mechanically defined range of the speed ratio of the transmission, when a ratio of change of the actual speed ratio is lower than a predetermined reference value while a value of the drive signal is larger than a predetermined value.

In another arrangement of the same form of the invention, the control means controls the shift control valve device such that the actual speed ratio of the transmission coincides with a determined target speed ratio, and the limiting means limits the determined target speed ratio such that the determined target speed ratio is held within a permissible control range which is predetermined based on the upper and lower limits of the mechanically defined range which is detected by the detecting means.

In a further arrangement of the same form of the invention, the control means controls the shift control valve device such that an actual speed of the input shaft of the transmission coincides with a determined target speed, and the limiting means limits the determined target speed such that the determined target speed is held within a permissible control range which is predetermined based on the upper and lower limits of the mechanically defined range which is detected by the detecting means.

BRIEF DESCRIPTION OF THE DRAWINGS

The above and optional objects, features and advantages of the present invention will be better understood by reading the following detailed description of presently preferred embodiments of the present invention, when considered in connection with the accompanying drawings, in which:

FIG. 8 is a graph indicating an ideal relationship between a second line pressure and a speed ratio of a continuously variable transmission shown in FIG. 1;

FIG. 10 is a view explaining a relationship between operating conditions of first and second solenoid valves of the shift control valve device of FIG. 9, and a shift motion of the continuously variable transmission;

FIGS. 11, 12 and 13 are graphs showing relationships between the speed ratio of the continuously variable transmission, and some specific hydraulic pressures in the hydraulic system, the graph of FIG. 11 relating to a positive-torque condition of the continuously variable transmission, the graph of FIG. 12 relating to a negative-torque (engine-brake) condition of the transmission, and the graph of FIG. 13 relating to a non-load condition of the transmission;

DETAILED DESCRIPTION OF THE PREFERRED EMBODIMENTS

Figure 1:
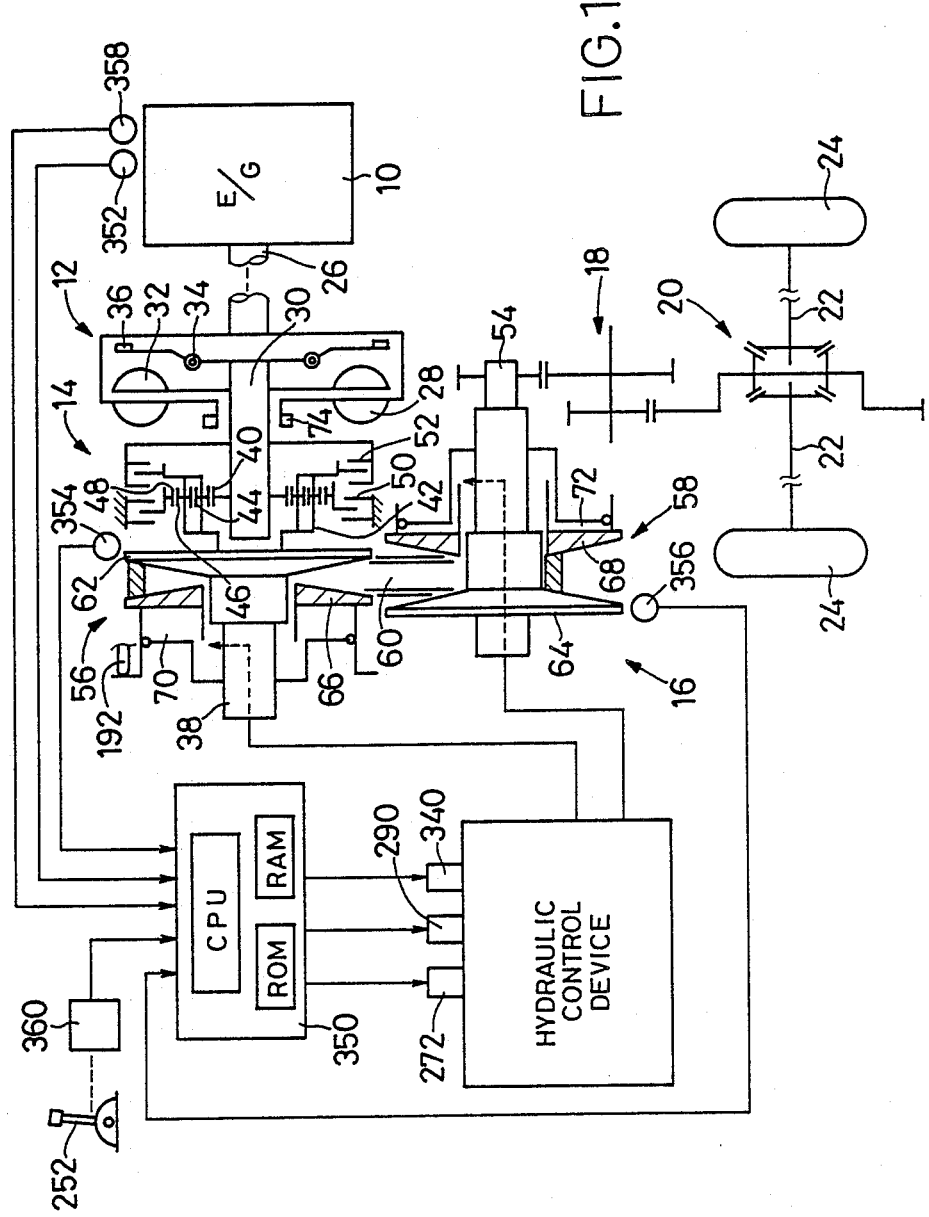
FIG. 1 is a schematic view of a power transmitting system for a motor vehicle, which is controlled by one embodiment of a hydraulic control device of the present invention.

Referring first to FIG. 1, there is shown a power transmitting system wherein power of an engine 10 of a motor vehicle is transmitted to drive wheels 24, via a fluid coupling 12 with a lock-up clutch 36, an auxiliary transmission 14, a belt-and-pulley continuously variable transmission (hereinafter abbreviated as "CVT") 16, an intermediate gear device 18, a differential gear device 20, and drive shafts 22 connected to the drive wheels 24.

The fluid coupling 12 has a pump impeller 28 connected to a crankshaft 26 of the engine 10, a turbine 32 fixed to an input shaft 30 of the auxiliary transmission 14 and rotated by rotation of the pump impeller 28 via a fluid in the coupling 12, and the above-indicated lock-up clutch 36 fixed to the input shaft 30 via a damper 34. The lock-up clutch 36 is engaged to directly couple the crankshaft 26 to the input shaft 30 when the running speed of the vehicle or the rotating speed of the engine 10 or turbine 32 exceeds a predetermined limit.

The auxiliary transmission 14 consists of a well known, double-pinion type planetary gear mechanism, which includes: a pair of mutually meshing planetary gears 44, 46 which are rotatably supported by a carrier 42 fixed to an input shaft 38 of the CVT 16 (output shaft of the auxiliary transmission 14); a sun gear 40 which is fixed to the input shaft 30 of the auxiliary transmission 14 (output shaft of the fluid coupling 12) and which meshes with the internal planetary gear 44; a ring gear 48 which meshes with the external planetary gear 46; a REVERSE brake 50 for stopping rotation of the ring gear 48; and a FORWARD clutch 52 for connecting the carrier 42 to the input shaft 30 of the auxiliary transmission 14. The REVERSE brake 50 and the FORWARD clutch 52 are hydraulically operated frictional coupling devices. When both of these two devices 50, 52 are placed in their disengaged position, the auxiliary transmission 14 is placed in its neutral position wherein power is not transmitted through the transmission 14. When the FORWARD clutch 52 is engaged, the output shaft 30 of the fluid coupling 12 is connected to the input shaft 38 of the CVT 16, whereby power from the engine 10 is transmitted in a forward direction to drive the vehicle frontwards. When the REVERSE brake 50 is engaged, on the other hand, the direction of rotation of the input shaft 38 of the CVT 16 is reversed with respect to that of the output shaft 30 of the fluid coupling 12, whereby the power from the engine 10 is transmitted in a reverse direction to drive the vehicle rearwards.

The CVT 16 has a pair of variable-diameter pulleys 56, 58 provided on its input and output shafts 38, 54, respectively, and a transmission belt 60 which connects the input and output pulleys 56, 58. The two pulleys 56, 58 have substantially the same nominal diameters. Each of the pulleys 56, 58 consists of a fixed rotor 62, 64 fixed to the input or output shaft 38, 54, and a movable rotor 66, 68 which is axially slidable on the shaft 38, 54 and which is rotated with the shaft 38, 54. The movable rotors 66 and 68 are moved by respective hydraulic actuators in the form of hydraulic cylinders 70, 72, so as to change a width of a V groove defined by the fixed and movable rotors 62–66 or 64–68, whereby effective diameters of the pulleys 56, 58 (diameters at which the belt 60 engages the pulleys) are changed, so as to vary a speed ratio "e" (Nout/Nin, where Nout=rotating speed of the output shaft 54, and Nin=rotating speed of the input shaft 38) of the CVT 16. Since the input and output pulleys 56, 58 have substantially the same nominal diameters, the corresponding input and output hydraulic cylinders 70, 72 have substantially the same pressure-receiving areas. Usually, a tension of the transmission belt 60 is associated with a force acting thereon, which is produced by the pressure in one of the two cylinders 70, 72 which is provided on the driven pulley 56, 58.

It is noted that axial movements of the movable rotors 66 and 68 are limited by a suitable mechanism (not shown). Thus, a range in which the speed ratio of the CVT 16 is variable is mechanically defined or determined.

An oil pump 74 is connected integrally with the pump impeller 28 of the fluid coupling 12 and is consequently driven by the crankshaft 26. This pressure source is used as a hydraulic pressure source of a hydraulic control device for controlling the instant power transmitting system.

Figure 2:
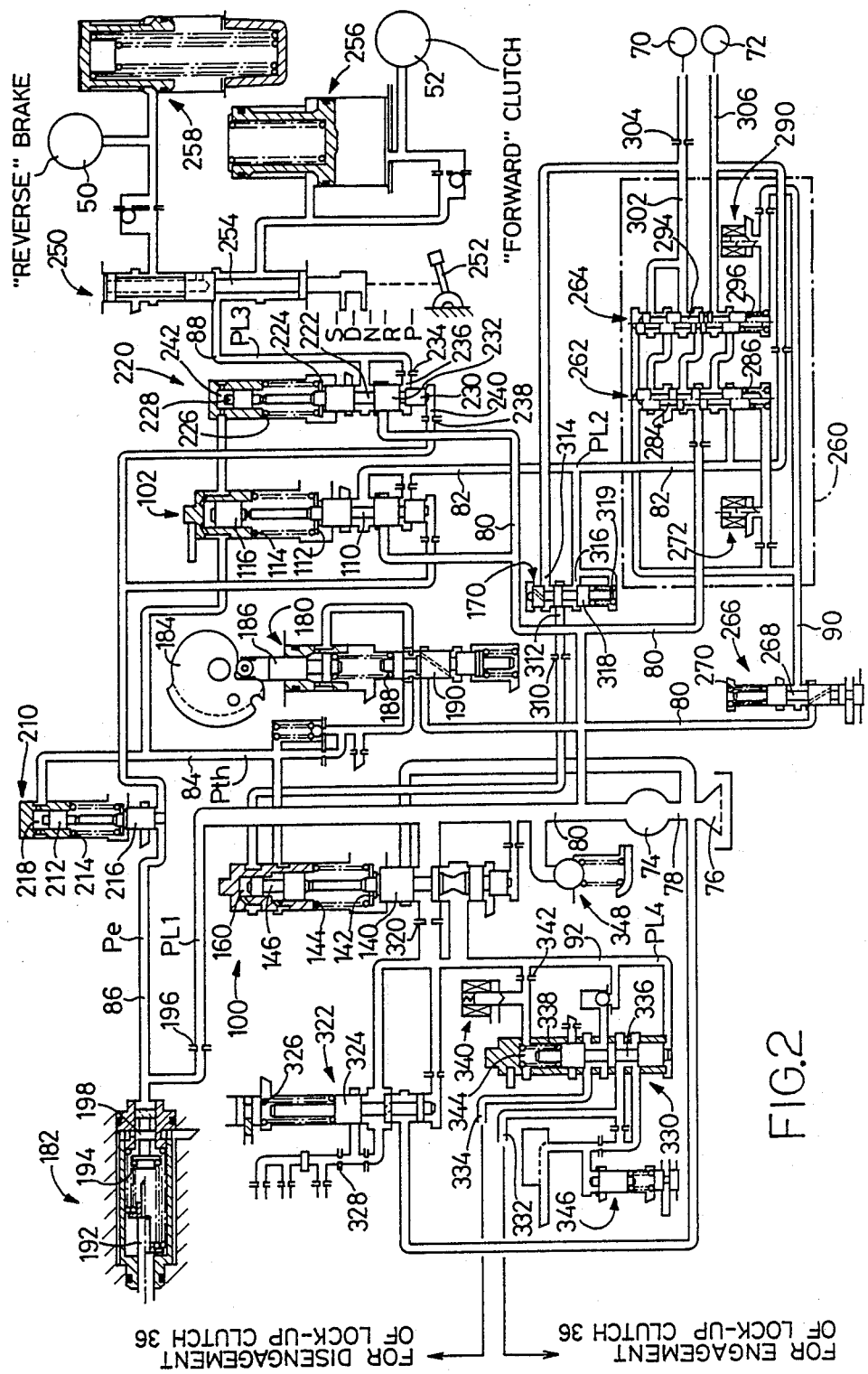
FIG. 2 is a circuit diagram showing the hydraulic control device for controlling the power transmitting system of FIG. 1.

The hydraulic control device for controlling the power transmitting system generally shown in FIG. 1 is illustrated in FIG. 2. The oil pump 74 sucks up a working fluid from a reservoir (not shown) through a strainer 76 and a suction line 78, and delivers the thus pressurized fluid to a first pressure line 80 which has a first line pressure PL1. The first line pressure PL1 in the first pressure line 80 is adjusted by a first pressure regulating valve 100 of an overflow or relief type, which is operated to return a portion of the fluid from the pump 74 to the suction line 78 and deliver a portion of the fluid to a LOCK-UP CLUTCH line 92. The first line pressure PL1 is reduced into a second line pressure PL2 by a second pressure regulating valve 102 of a pressure reducing type.

Figure 3:
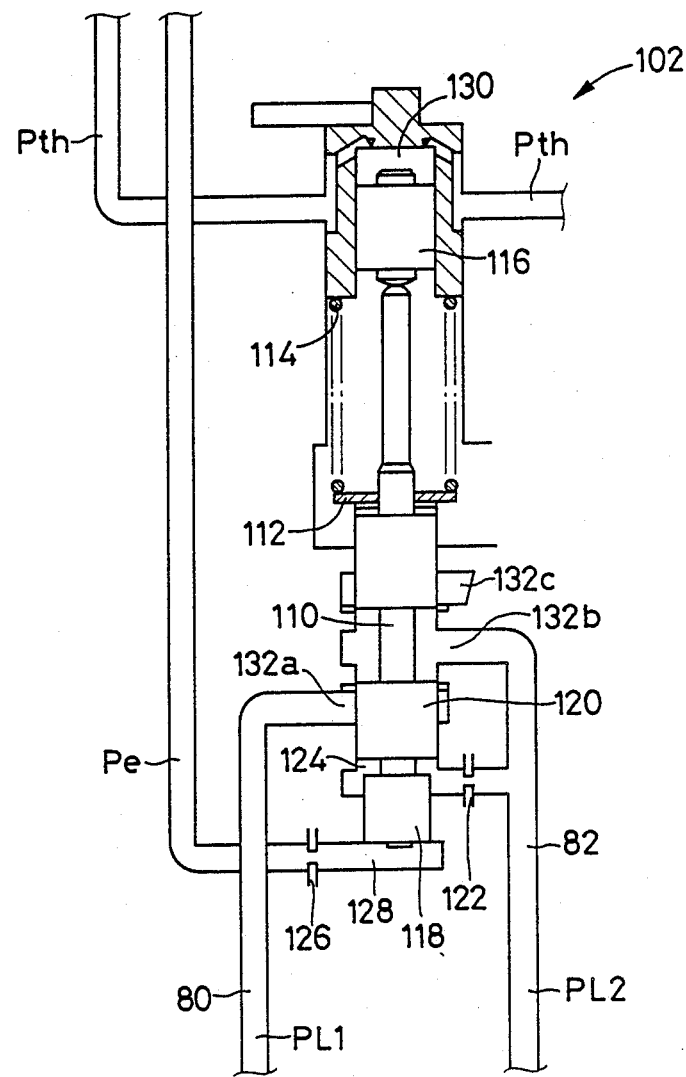
FIG. 3 is a view illustrating details of a second pressure regulating valve shown in FIG. 2.

The construction of the second pressure regulating valve 102 will be first described, by reference to FIG. 3. This second pressure regulating valve 102 is provided downstream of the first pressure regulating valve 100, and has a valve spool 100 for selective connection and disconnection of the first and second pressure lines 80 and 82. The second pressure regulating valve 102 further has a spring seat 112, a return spring 114 and a plunger 116. Between a first land 118 and a second land 120 of the spool 110, there is formed a chamber 124 to which the second line pressure PL2 is applied as a feedback pressure through a restrictor 122, whereby the spool 110 is biased toward its closed position by the second line pressure PL2. The first land 118 is also exposed to a chamber 128 to which a SPEED RATIO pressure Pe (which will be described) is applied through a restrictor 126, whereby the spool 110 is biased towards its closed position by the pressure Pe. At the same time, the spool 110 of the second pressure regulating valve 102 is baised toward its open position, by the return spring 114 via the spring seat 112. An outer end face of the plunger 116 is exposed to a chamber 130 to which a THROTTLE pressure Pth (which will be described) is applied, whereby the spool 110 is biased toward its open position by this THROTTLE pressure Pth. The spool 110 is located at an equilibrium position determined by the following equation (1):

$$PL2 = (A3 \cdot Pth + W - A1 \cdot Pe)/(A2 - A1) \qquad (1)$$

where,
A1: Pressure receiving area of the first land 118
A2: Pressure receiving area of the second land 120
A3: Pressure receiving area of the plunger 116
W: Biasing force of the return spring 114

Described more specifically, the valve spool 110 is moved so as to satisfy the equation (1), alternately between a first position in which the fluid in the first pressure line 80 communicating with a port 132a is fed into the second pressure line 82 through a port 132b, and a second position in which the fluid in the second pressure line 82 communicating with the port 132b is returned to a drain through a drain port 132c. In this way, the second line pressure PL2 is established. Since the second pressure line 82 is a closed hydraulic circuit, the second pressure regulating valve 102 is adapted to reduce the relatively high first line pressure PL1 to the second line pressure PL2.

Figure 4:
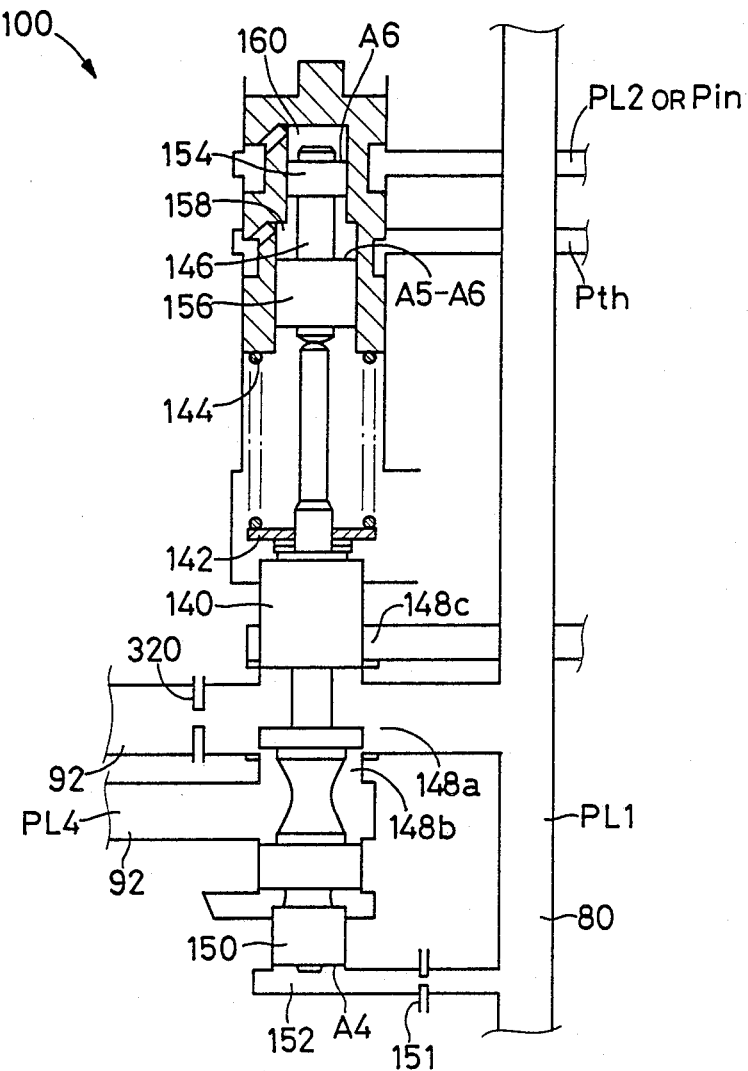
FIG. 4 is a view illustrating details of a first pressure regulating valve shown in FIG. 2.

As shown in FIG. 4, the first pressure regulating valve 100 includes a valve spool 140, a spring seat 142, a return spring 144 and a plunger 146. The spool 140 operates to effect selective connection and disconnection of a port 148a communicating with the first pressure line 80, to and from a drain port 148b or a port 148c. An outer end face of a first land 150 of the spool 140 is exposed to a chamber 152 to which the first line pressure PL1 is applied through a restrictor 151, whereby the spool 140 is biased toward its open position by the first line pressure PL1. The plunger 146, which is coaxial with the spool 140, is formed with a first land 154 and a second land 156. Between these two lands 154, 156, there is formed a chamber 158 to which the THROTTLE pressure Pth is applied. An outer end face of the first land 154 is exposed to a chamber 160 to which higher one of the second line pressure PL2 and an input cylinder pressure Pin in the input side cylinder 70 is selectively applied, according to an operation of a switch valve 170 which will be described. The spool 140 is biased toward its closed position, by a biasing force of the return spring 144 via the spring seat 142. The spool 140 is located at an equilibrium position determined by the following equation (2):

$$PL1 = [(Pin \text{ or } PL2) \cdot A6 + Pth(A5 - A6) + W]/A4 \quad (2)$$

where,

A4: Pressure receiving area of the first land 150
A5: Cross sectional area of the second land 156 of the plunger 146
A6: Pressure receiving area of the first land 154 of the plunger 146
W: Biasing force of the return spring 144

Described more specifically, a portion of the fluid in the first pressure line 80 which is directed to the port 148a is discharged simultaneously to the drain port 148a and the port 148c, to thereby adjust the first line pressure PL1, as the value spool 140 is moved according to the equation (2).

Figure 5:
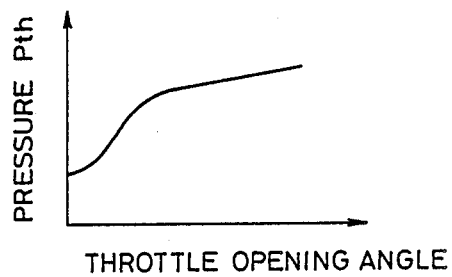
FIG. 5 is a graph indicating an output characteristic of a throttle-opening sensing valve shown in FIG. 2.

Referring back to FIG. 2, the THROTTLE pressure Pth indicated above represents ana ctual opening angle θth of a throttle valve of the engine 10, and is produced by a throttle-opening sensing valve 180. The SPEED-RATIO pressure Pe represents an actual speed ratio of the CVT 16, and is produced by a speed-ratio sensing valve 182. Described in detail, the throttle-opening sensing valve 180 includes: a cam 184 rotated in response to an operation of the throttle valve; a plunger 186 which engages a cam surface of the cam 184 and which is axially moved in relation to an angle of rotation of the cam 184; and a valve spool 190 which is moved to an equilibrium position in which a thrust of the plunger 186 acting on the spool 190 via a spring 188 is balanced with the first line pressure PL1, whereby the first line pressure PL1 is reduced into the THROTTLE pressure Pth which corresponds to the actual opening angle θth of the throttle valve. FIG. 5 shows a relationship between the THROTTLE pressure Pth and the throttle opening angle θth. The THROTTLE pressure Pth is supplied through a fluid line 84 to the first pressure regulating valve 100, the second pressure regulating valve 102, a limit valve 210 and a fourth pressure regulating vavle 220.

Figure 6:
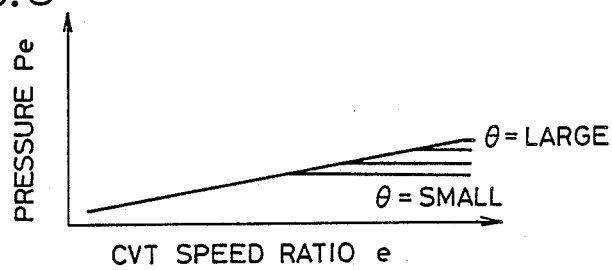
FIG. 6 is a graph indicating an output characteristic of a speed-ratio sensing valve shown in FIG. 2.

The SPEED-RATIO sensing valve 182 includes: a sensing rod 192 which is held in sliding engagement with the movable rotor 66 on the input shaft 38 of the CVT 16, so that the rod 192 is axially moved by an amount equal to an axial displacement of the rotor 66; a spring 194 which produces a biasing force which varies with the position of the sensing rod 192; and a valve spool 198 which receives the biasing force of the spring 194, and which is moved to an equilibrium position in which a thrust based on the biasing force of the spring 194 is balanced with a thrust based on the first line pressure PL1, whereby a rate of flow of the fluid to the drain from the sensing valve 182 is changed. If the speed ratio "e" of the CVT 16 becomes relatively high, i.e., if the fixed rotor 62 on the input shaft 38 is moved toward the movable rotor 66 (with the width of the V groove becoming smaller), the sensing rod 192 is moved into the valve 182. Consequently, the amount of the fluid which is fed into the valve 182 through an orifice 196 and which is discharged to the drain by the spool 198 is reduced, whereby the pressure at a position downstream of the orifice 196 is raised. This raised pressure is the SPEED-RATIO pressure Pe, which is increased as the speed ratio "e" of the CVT 16 is increased, as indicated in FIG. 6. The thus generated SPEED-RATIO pressure Pe is supplied through a fluid line 86 to the second and third pressure regulating valves 102 and 220.

Figure 7:
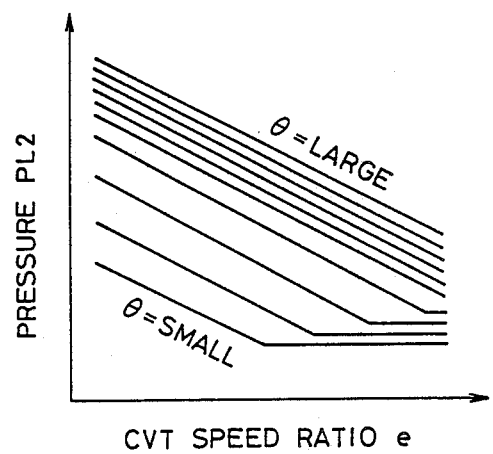
FIG. 7 is a graph indicating an output characteristic of the second pressure regulating valve of FIG. 3.

The limit valve 210 includes a plunger 212, and a valve spool 216 which receives a thrust of a spring 214 and a thrust of the plunger 212, in a direction toward its closed position. An outer end face of the plunger 212 is exposed to a chamber 218 to which the THROTTLE pressure Pth is applied. The spool 216, which is biased toward its closed position by the thrust of the spring 214 and the thrust of the plunger 212 based on the THROTTLE pressure Pth, is biased in the opposite direction toward its open position, by a thrust based on the SPEED-RATIO pressure Pe. When the thrust based on the SPEED-RATIO pressure Pe exceeds a sum of the thrusts of the spring 214 and plunger 212, the spool 216 is placed in the open position in which the fluid line 86 is connected to the drain, to thereby prevent an increase of the SPEED-RATIO pressure Pe beyond an upper limit in relation to the throttle opening angle θth, as indicated in FIG. 6. Since the SPEED-RATIO pressure Pe is saturated at the upper limit predetermined by the throttle opening angle θ th, the second line pressure PL2 controlled by the second pressure regulating valve 102 according to the equation (1) is prevented from being lowered with a decrease of the throttle opening angle θ th, while the speed ratio "e" of the CVT 16 is relatively high, as indicated in FIG. 7. In other words, the instant hydraulic control circuit provides the relative low line pressure (second line pressure PL2) which is varied with the speed ratio "e", for controlling the tension of the transmission belt 60, almost according to an ideal curve as indicated in FIG. 8, without using an electromagnetic pressure regulating servo valve controlled by a microcomputer. Therefore, the hydraulic control device is available at a comparatively reduced cost.

The third pressure regulating valve 220 is adapted to produce a third line pressure PL3 for activating the REVERSE brake 50 and the FORWARD cluth 52 of the auxiliary transmission 14. The third pressure regulating valve 220 includes: a valve spool 222 for selective connection and disconnection of the first pressure line 80 and a third pressure line 88; a spring seat 224; a return spring 226; and a plunger 228. Between a first land 230 and a second land 232 of the spool 222, there is formed a chamber 236 to which the third line pressure PL3 is applied as a feedback pressure through a restrictor 234. Namely, the spool 222 is biased by the third line pressure PL3 in a direction toward its closed position. An outer end face of the first land 230 is exposed to a chamber 240 to which the SPEED-RATIO pressure Pe is applied through a restrictor 238, whereby the spool 222 is biased by the SPEED-RATIO pressure Pe toward its closed position. At the same time, the valve spool 222 is biased in a direction toward its open position, by a biasing force of the return spring 226 through a spring seat 224. Further, an outer end face of the plunger 228 is exposed to a chamber 242 to which the THROTTLE Pressure Pth is applied, whereby the spool 222 is biased toward the open position by the THROTTLE pressure Pth. In this arrangement, the third line pressure PL3 is adjusted to an optimum level, according to an equation similar to the equation (1) given above, based on the SPEED-RATIO pressure Pe and the THROTTLE pressure Pth. This optimum level is a minimum level required to permit the auxiliary transmission 14 to transmit a torque without a slip in the REVERSE brake 50 and the FORWARD clutch 52.

The third line pressure PL3 obtained by the third pressure regulating valve 220 is supplied to the FORWARD clutch 52 or REVERSE brake 50 through a shift-lever valve 250. That is, the shift-lever valve 250 has a valve spool 254 which is axially moved in relation to an operating position of a shift lever 252 of the vehicle. When the shift lever 252 is placed in its N (NEUTRAL) position, the third line pressure PL3 is not supplied to the auxiliary transmission 14. When the shift lever 252 is placed in its L (LOW), S (SECOND) or D (DRIVE) position, the third line pressure PL3 is supplied primarily to the FORWARD clutch 52 while the fluid is discharged from the REVERSE brake 50. When the shift lever 252 is placed in its R (REVERSE) position, the third line pressure PL3 is supplied primarily to the REVERSE brake 50 while the fluid is discharged from the FORWARD clutch 52. With the shift lever 252 placed in its P (PARKING) position, the fluid is discharged from both of the FORWARD clutch 52 and the REVERSE brake 50. Accumulators 256 and 258 are connected to the FORWARD clutch 52 and REVERSE brake 50, in order to permit smooth frictional engagements of these members 52, 50.

The first and second line pressures PL1, PL2 adjusted by the first and second pressure regulating valves 100, 102 are supplied to one and the other of the two hydraulic cylinders 70, 72, through a CVT shift control valve device 260, so that the speed ratio "e" of the CVT 16 is controlled. The CVT shift control valve device 260 consists of a shift-direction switching directional control valve 262, and a shift-speed control flow control valve 264. To operate these directional control and flow control valves 262, 264, a pilot pressure Pp produced by a pilot pressure control valve 266 is applied to the valves 262, 264 through a pilot line 90. The pilot pressure control valve 266 includes a valve spool 268 for selective connection and disconnection of the first pressure line 80 and the pilot line 90, and a spring 270 for biasing the spool 268 toward its open position. The spool 268 is moved to an equilibrium position in which the pilot pressure Pp acting in the direction toward the closed position is balanced with the biasing force of the spring 270. Thus, the first line pressure PL1 is reduced to the suitable pilot pressure Pp.

Figure 9:
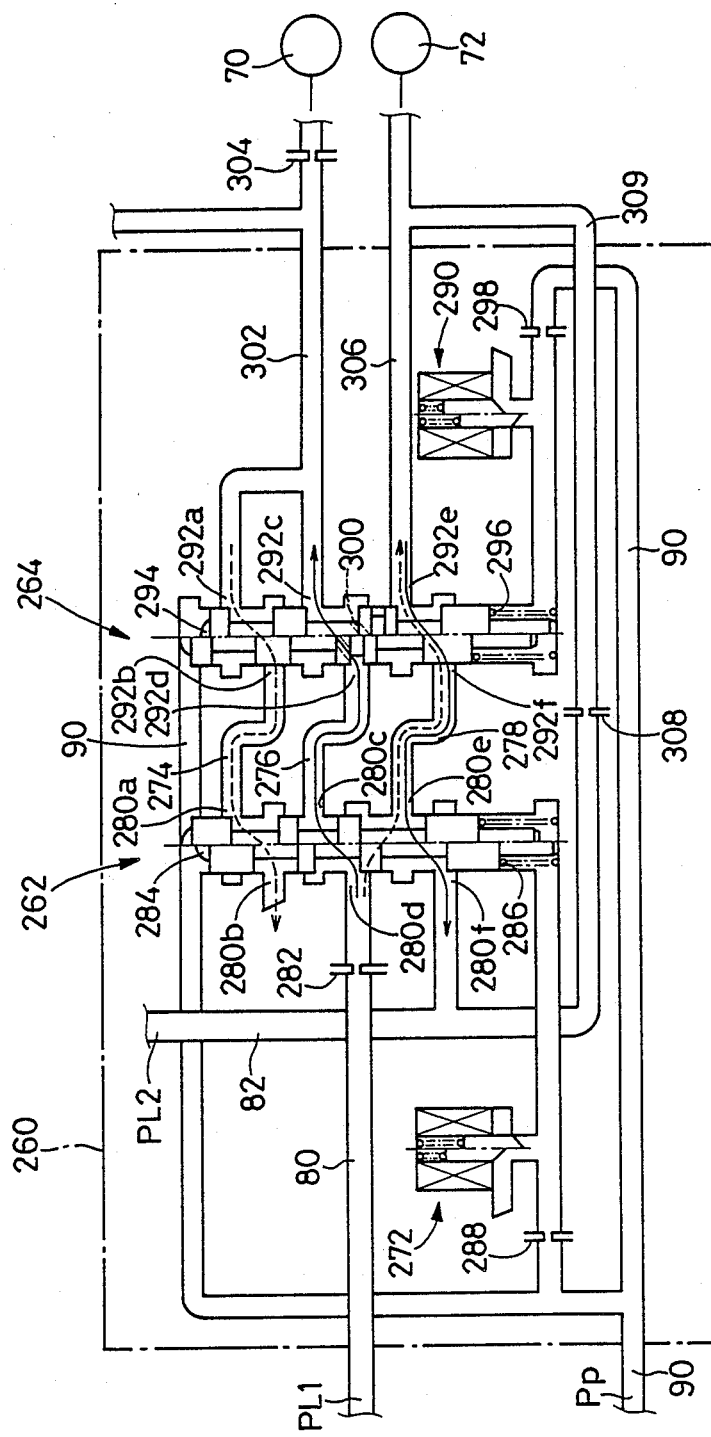
FIG. 9 is a view showing in detail an arrangement of a shift control valve device shown in FIG. 2, for the continuously variable transmission.

As shown in detail in FIG. 9, the shift-direction switching directional control valve 262 is a spool valve controlled by a first slenoid valve 272. This spool valve 262 has: ports 280a, 280c and 280e which communicate respectively with three connecting passages, i.e., first, second and third connecting passages 274, 276, 278 which connect the instant directional control valve 262 to the shift-speed control flow control valve 264; a drain port 280b which communicates with the drain; a port 280d to which the first line pressure PL1 is applied through a restrictor 282; a port 280f to which the second line pressure PL2 is applied; a valve spool 284 which is slidably movable between a first position (upper stroke end as indicated in FIG. 9, by the right half of the spool) and a second position (lower stroke end as indicated in FIG. 9, by the left half of the spool); and a spring 286 which biases the spool 284 in a direction toward the first position. One of opposite ends of the spool 284 is always exposed to the pilot pressure Pp, while the other end (lower end as seen in FIG. 9) is exposed to the pilot pressure Pp only when the first slenoid valve 272 is off, i.e., in its closed position. While the solenoid valve 272 is on or in its open position, the pilot pressure Pp is released to the drain through the valve 272, which is located downstream of a restrictor 288. In the open position of the solenoid valve 272, therefore, the pilot pressure Pp does not act on the lower end of the spool 284. Accordingly, while the first solenoid valve 272 is on, the spool 284 is placed in the second position in which the port 280a and the drain port 280b are disconnected from each other while the ports 280d and 280e are disconnected from each other. At the same time, the ports 280c and 280d communicate with each other, while the ports 280e and 280f communicate with each other. While the solenoid valve 272 is off, the spool 284 is placed in the first position in which the port 280a and the drain port 280b communicate with each other while the ports 280e and 280d communicate with each other. At the same time, the ports 280c and 280d are disconnected from each other while the ports 280e and 280f are disconnected from each other. The directional control valve 262 is constructed such that the fluid communication between the appropriate two ports 280a-280f occurs while the ports are partially closed by the appropriate lands of the spool 284. This arrangement shortens the operating stroke of the spool 284, thereby improving the operating response of the valve 262. The relatively short operating stroke of the spool 284 does not cause a problem in operation, since the cross sectional areas of the ports 280a-280f are determined so as to permit sufficient amounts of flow of the fluid through the partially open ports.

The shift-speed control flow control valve 264 is a spool valve controlled by a second solenoid valve 290. This spool valve 264 includes: ports 292b, 292d and 292f which communicate respectively with the first, second and third connecting passages 274, 276, 278 indicated above; ports 292a and 292c which communicate with the input side hydraulic cylinder 70; a port 292e which communicates with the output side hydraulic cylinder 72; a valve spool 294 which is slidably movable between a first position (upper stroke end as indicated in FIG. 9, by the left half of the spool) and a second position (Lower stroke end as indicated in FIG. 9, by the right half of the spool); and a spring 296 which biases the spool 294 toward the first position.

As in the directional control valve 262, one of opposite ends of the spool 294 is always exposed to the pilot pressure Pp, while the other end (lower end as seen in FIG. 9) is exposed to the pilot pressure Pp only when the second solenoid valve 290 is off. While the solenoid valve 290 is on or inits open position, the pilot pressure Pp is released to the drain through the valve 290, which is located downstream of a restrictor 298. In the open position of the slenoid valve 290, therefore, the pilot pressure Pp does not act on the lower end of the spool 294. Accordingly, while the second solenoid valve 290 is on (duty cycle=100%) the spool 294 is placed in the second position in which the ports 292a and 292b communicate with each other. At the same time, the ports 292c and 292d communicate with each other, while the ports 292e and 292f communicate with each other. While the solenoid valve 290 is off (dty cycle=0%), the spool 294 is placed in the first position in which the communictions between the ports 292a and 292b, between the ports 292c and 292d, and between the ports 292e and 292f ar interrupted.

While the second solenoid valve 290 is off, the ports 292c and 292d are disconnected from each other. However, these two ports 292c, 292d only slightly communicate with each other, through a restrictor hole 300 formed through the spool 294. Further, the input side hydraulic cylinder 70 communicates with the ports 292a and 292c, through an input side passage 302 provided with a restrictor 304. The output side hydraulic cylinder 72 communicates with the port 292e through an output side passage 306, and with the second pressure line 82 through a by-pass passage 309 provided with a restrictor 308. Like the directional control valve 262, the flow control valve 264 is constructed such that the fluid communication between the appropriate two ports 292a-292f occurs while the ports are partially closed by the appropriate lands of the spool 294. Thus, the operating stroke of the spool 294 is made relatively short.

Accordingly, while the first solenoid valve 272 is in the on state, the fluid in the first pressure line 80 is fed into the input side hydraulic cylinder 70, through the restrictor 282, ports 280d and 280c, second connecting passage 276, ports 292d and 292c, input side passage 302 and restrictor 304, as indicated in solid line in FIG. 9. In the meantime, the fluid in the output side hydraulic cylinder 72 is discharged through the output side passage 306, ports 292e and 292f, third connecting passage 278, and ports 280e and 280f, as also indicated in solid line in FIG. 9. Consequently, the first line pressure PL1 in the first pressure line 80 acts on the input side hydraulic cylinder 70, while the second line pressure PL2 in the second pressure line 82 acts on the output side hydraulic cylinder 72. As a result, the equilibriunm between the thrusts of the two cylinders 70, 72 is lost, whereby the CVT 16 is shifted in a direction to increase the speed ratio "e" (in the speed-ratio increasing direction), namely, the speed ratio "e" is increased.

While the first solenoid valve 272 is in the off state, on the other hand, the fluid in the first pressure line 80 is fed into the output side hydraulic cylinder 72 through the restrictor 282, ports 280d and 280e, third connecting passage 278, ports 292f and 292e and output side passage 306, while the fluid in the input side hydraulic cylinder 70 is discharged through the restrictor 304, input side passage 302, ports 292a and 292b, first connecting passage 274, port 280a and drain port 280b, as indicated in broken line in FIG. 9. Consequently, the first line pressure PL1 in the first pressure line 80 acts on the output side hydraulic cylinder 72, while the considerably low pressure acts on the input side hydraulic cylinder 70. As a result, the equilibrium between the thrusts of the two cylinders 70, 72 is lost, whereby the CVT 16 is shifted in a direction to decrease the speed ratio "e" (in the speed-ratio decreasing direction), namely, the speed ratio "e" is decreased.

As described above, the fluid communications between the ports 292a and 292b, between the ports 292c and 292d and between the ports 292e and 292f are permitted or interrupted in response to the on/off operations of the second solenoid valve 290, whereby the flows of the fluid as indicated in slid and broken lines in FIG. 9 are controlled between a non-restricted state and a restricted state. Therefore, the CVT 16 is shifted at a high rate or a low rate, in the speed-ratio decreasing or speed-ratio increasing direction. That is, the speed ratio "e" is rapidly or slowly decreased or increased. Further, the valve spool 294 is placed in an intermediate position thereof when the second slenoid valve 290 is alternately turned on and off (operated in a duty cycle control mode). In this case, the CVT 16 is shift up or down at an intermediate rate. A table in FIG. 10 indicates shift-up and shift-down motions of the CVT 16 at the three different rates, in relation to the operating conditions of the first and second solenoid valves 272 and 290. When the first solenoid valve 272 is on while the second solenoid valve 290 is off, the fluid in the first pressure line 80 is supplied to the input side hydraulic cylinder 70 through the restrictor hole 300 in the spool 294, while the fluid in the output side hydraulic cylinder 72 is discharged into the second pressure line 82 through the restrictor 308. When the first and second solenoid valves 272, 290 are both off, the fluid in the second pressure line 82 is supplied to the output side hydraulic cylinder 72 through the restrictor 308, while the fluid in the input side hydraulic cylinder 70 is discharged through a small amount of clearance provided between the sliding surfaces of the piston and cylinder block. The restrictor 308 is provided to avoid a decrease in the pressure Pout in the output side hydraulic cylinder 72, when the CVT 16 is shifted to decrease the speed ratio "e", with the pressure Pout higher than the pressure Pin in the input side hydraulic cylinder 70.

Figure 12:
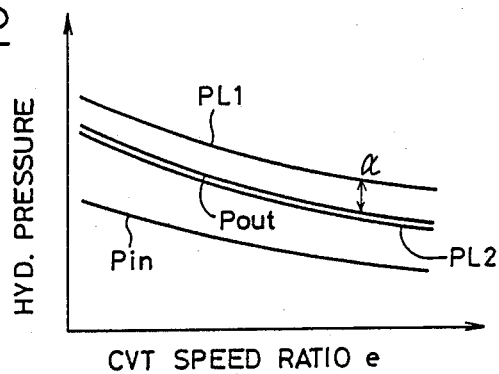
Figure 13:
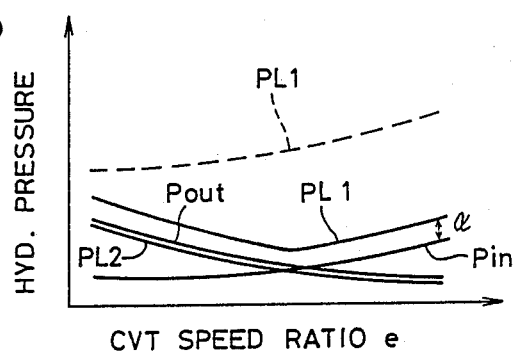

It is desirable that the first line pressue PL1 for the CVT 16 be changed with the speed ratio "e" of the CVT 16, as indicated in FIG. 11 when the vehicle runs in a positive-torque condition (wherein the torque is transmitted from the input shaft 38 to the output shaft 54), or as indicated in FIG. 12 when the vehicle runs in an engine-brake condition (wherein the torque is transmitted from the output shaft 54 to the input shaft 38). The curves of the graphs in FIGS. 11 and 12 indicate the required pressure levels when the speed ratio "e" of the CVT 16 is changed over its entire range, where the input shaft 38 is rotated with a constant torque. In the present embodiment wherein the pressure receiving areas of the input and output side hydraulic cylinders 70, 72 are substantially the same, the pressure Pin in the input side hydraulic cylinder 70 is larger than the pressure Pout in the output side hydraulic cylinder 72 when the vehicle runs in the positive-torque condition, as indicated in FIG. 11, and the pressure Pout is larger than the pressure Pin when the vehicle runs in the engine-brake condition, as indicated in FIG. 12. In either case, the pressure in the hydraulic cylinder 70, 72 which is on the driving side is larger than that in the hydraulic cylinder on the driven side. Since the pressure Pin in the positive-torque condition produces a thrust in the cylinder on the driving side, it is desirable that the first line pressure PL1 be higher than the pressure Pin by an extra vaue $\alpha$ which is a required minimum for giving the thurst to the driving side cylinder to establish a desired speed ratio "e", and for minimizing the power loss. However, it is impossible to adjust the first line pressure PL1 as indicated in FIGS. 11 and 12, solely by the pressure in one of the two cylinders 70, 72. Therefore, the present hydraulic control device is provided with the switch valve 170 described above, in order to apply the higher one of the pressures Pin and PL2 to the first pressure regulating valve 100. This is also required when the first line pressure PL1 is adjusted to a level which is higher than the higher one of the pressures Pin and Pout (almost equal to the second line pressure PL2), by an extra amount $\alpha$, where the vehicle runs with the CVT 16 placed in a non-load condition in which a curve indicative of the pressure Pin and a curve indicative of the pressure Pout intersects each other, as indicated in FIG. 13.

The switch valve 170 has: a common port 312 which communicates with the first pressure regulating valve 100 through a restrictor 310; a first port 314 which communicates with the input side passage 302; a second port 316 which communicates with the second pressure line 82; a valve spool 318 which is movable between a first position for connection of the common port 312 to the first port 314, and a second position for connection of the common port 312 to the second port 316; and a spring 320 for biasing the spool 318 toward the second position. The opposite ends of the spool 318 receive the pressure Pin in the input side hydraulic cylinder 70 and the second line pressure PL2, respectively, so that the spool 318 is moved toward one of the first and second positions, so as to apply the higher one of the pressures Pin and PL2 to the chamber 160 of the first pressure regulating valve 100. Described more precisely, the pressure Pin is applied to the chamber 160 when a thrust based on the pressure Pin exceeds a sum of a thrust based on the second line pressure PL2 and a thrust of the spring 319. It is noted that the thrust (biasing force) of the spring 319 is very small. Since the pressure Pout in the output side hydraulic cylinder 72 is substantially equal to the second line pressure PL2 during running of the vehicle with the CVT 16 placed in the positive-torque or non-load condition, the switch valve 170 functions to select the higher one of the pressures Pin and Pout of the two hydraulic cylinders 70, 72.

As described above, the switch valve 170 is adapted to apply the higher one of the pressures Pin (pressure in the input side hydraulic cylinder 70) and PL2 (second line pressure) to the chamber 160 of the first pressure regulating valve 100 as a feedback pressure. Consequently, the first line pressure PL1 can be adjusted to a level which is higher by a relatively small extra amount $\alpha$ than the pressure Pin, or than the pressure Pout (almost equal to the second line pressure PL2), as indicated in FIG. 13. Thus, the first line prssure PL1 is controlled to be a required minimum level, so as to minimize a power loss of the hydraulic system. A curve indicated in dashed line in FIG. 13 shows the first line pressure PL1 where the switch valve 170 was not provided. In this case, the first line pressure PL1 is higher by an unnecessarily large extra amount than actually required, while the speed ratio "e" is relatively low.

Figure 14:
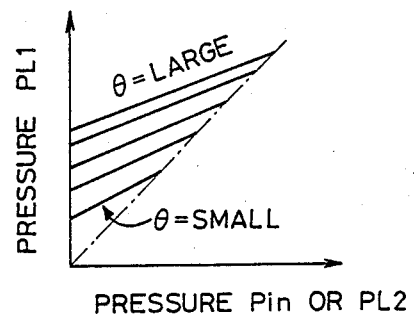
FIG. 14 is a graph illustrating a relationship between an output pressure of the first pressure regulating valve shown in FIG. 4, and a presure in the input side hydraulic cylinder of the continuously variable transmission, or a second line pressure of the system.

The extra amount $\alpha$ indicated above is determined to a required minimum value that permits the CVT 16 to be shifted to change its speed ratio "e" to a suitable value at a suitable rate, over the entire range of the speed ratio. It will be understood from the equation (2) given above that the first line pressure PL1 is controlled to be higher than the pressure Pin or Pout, by a suitable extra anount $\alpha$, which is determined based on the THROTTLE pressure Pth. That is, the areas of the pressure receiving surfaces of the first pressure regulating valve 100 and the biasing force of the spring 144 are determined so that the first line pressure PL1 is determined as described above. As indicated in FIG. 14, the first line pressure PL1 controlled by the first pressure regulating valve 100 increases with the pressure Pin or Pout and the THROTTLE pressure Pth, and the upper limit of the pressure PL1 varies with the THROTTLE pressure Pth.

The first pressure regulating valve 100 is connected to a fourth pressure line 92 which is provided downstream of the first pressure line 80. Described more particularly, the fluid which flows from the port 148a (communicating with the first pressure line 80) to the port 148b, and the fluid which is delivered through the restrictor 320, are controlled by a fourth pressure regulating valve 322 to a fourth line pressure PL4 in the fourth pressure line 92. The fourth line pressure PL4 is suitably adjusted to activate the lock-up clutch 36 of the fluid coupling 12. The fourth pressure regulating valve 322 is a relief valve which includes a valve spool 324 and a spring 326. The spol 324 receives as a feedback pressure the fourth line pressuee PL4 and is thus biased by this pressure PL4 towards its open position, and the spring 326 biases the spool 324 toward the closed psition. The spool 324 is moved to an equilibrium position in which a thrust based on the above-indicated feedback pressure is balanced with a thrust of the spring 326. In this equilibrium position, the fluid in the fourth pressure line 92 is partially released from the fourth pressure regulating valve 322 and is fed through a restrictor 328 to various lubricating points of the power transmitting system for lubrication of the relevant parts. Thus, the fourth line pressure PL4 is produced. The fluid used for the lubrication is returned to the suction line 78.

The fourth line pressure PL4 controlled by the fourth pressure regulating valve 322 is supplied through a lock-up clutch control valve 330, selectively to a CLUTCH ENGAGE passage 332 and a CLUTCH RELEASE passage 334, so that the lock-up clutch 36 of the fluid coupling 12 is engaged and disengaged as needed. The lock-up clutch control valve 330 includes a valve spool 336, and a spring 338 for biasing the spool 336 in a direction to release the clutch 36. The spool 336 operates to effect selective connection of the fourth pressure line 92 with the CLUTCH ENGAGE and CLUTCH DISENGAGE passages 33, 334. The spool 336 receives the fourth line pressure PL4 at its opposite ends. The spool 336 is moved in the direction to release the lock-up clutch 36 when a third solenoid valve 340 is off or in its closed position. The lock-up clutch control valve 330 as shown in FIG. 2 is placed in this condition. When the third solenoid valve 340 is turned on and opened, the fluid in the fourth pressure line 92 is released through the solenoid valve 340, which is disposed downstream of a restrictor 342, whereby the fourth line pressure PL4 which has been applied to a chamber 344 formed on one end of the spool 336 on the side of the spring 338 is removed, and consequently the spool 336 is moved in a direction that causes the lock-up clutch 36 to be engaged. A portion of the fluid supplied to the lock-up clutch control valve 330 is supplied to a cooling unit of the power transmitting system. The pressure of this fluid is controlled by a cooler by-pass valve 346. Reference numeral 348 in FIG. 2 designates a safety valve for preventing an excessive rise of the first line pressure PL1.

The electronic control unit 350 shown in FIG. 1 serves as control means for controlling the first, second and third solenoid valves 272, 290 and 340 of the hydraulic control device of FIG. 2, so that the speed ratio "e" of the CVT 16 and the engagement of the lock-up clutch 36 of the fluid coupling 12 are controlled. The control unit 350 comprises a so-called microcomputer which includes a central processing unit (CPU), a random-access memory (RAM) and a read-only memory (ROM). The control unit 350 receives: a signal indicative of a speed Ne of the engine 10, from an engine speed sensor 352; a signal indicative of a rotating speed Nin of the input shaft 38 of the CVT 16, from an input shaft speed sensor 354; a signal indicative of a rotating speed Nout of the output shaft 54 of the CVT 16, from an output shaft speed sensor 356; a signal indicative of the throttle opening angle $\theta$th, from a throttle opening sensor 358; and a signal indicative of a currently selected operating position Ps of the shift lever 252, from a shift-lever position sensor 360. The CPU of the control unit 350 processes the received various signals according to a control program stored in the ROM, while utilizing a temporary data storage function of the RAM, and generates output drive signals for controlling the first, second and third solenoid valves 270, 290 and 340.

The electronic control unit 350 is adapted to execute a main routine (not shown) which includes an initializing step, and a data reading step for storing in the RAM the input signals received from the various sensors. Based on the input signals stored in the RAM, the CPU calculates various parameters such as the rotating speed Nin of the inut shaft 38, the rotating speed Nout of the output shaft 54, the speed ratio "e" of the CVT 16 and a running speed "v" of the vehicle. The control unit 350 sequentially or selectively performs various control operations for controlling the lock-up clutch 36, CVT 16, and other members of the power transmitting system.

Figure 15:
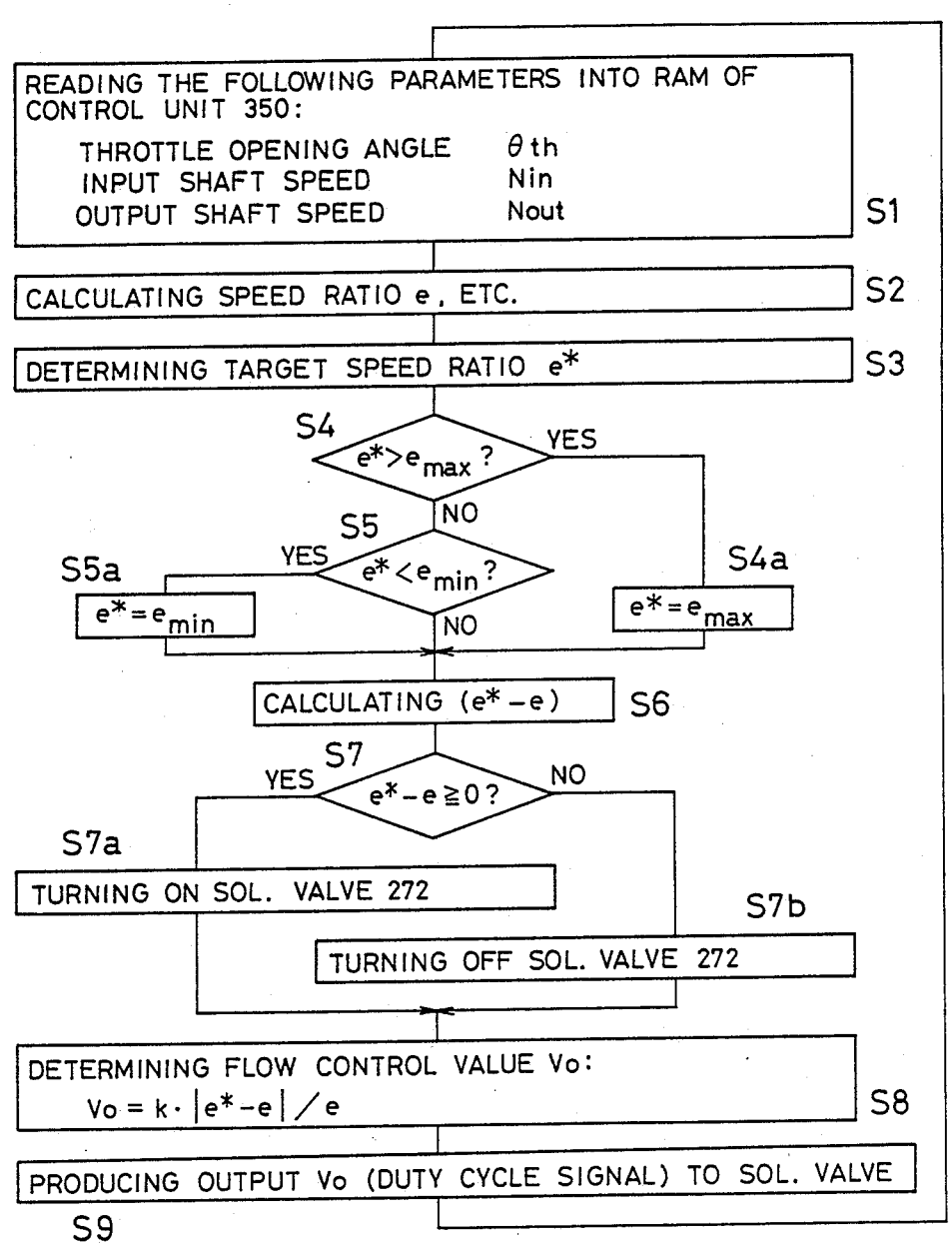
FIG. 15 is a flow chart illustrating an operation of the electronic control unit shown in FIG. 1.

An example of the control operation for the CVT 16 is illustrated in the flow chart of FIG. 15, wherein the CPU first executes step S1 in which the various input signals are stored in the RAM, and the speed Ne of the engine 10, speeds Nin and Nout of the input and output shafts 38, 54, throttle opening angle $\theta$th and other parameters are calculated based on the stored input signals. Step S1 is followed by step S2 in which the speed ratio "e" of the CVT 16, running speed "v" of the venicle and other parameters are calculated based on the input signals. Then, the control flow goes to step S3 to determine a target speed ratio "e*" of the CVT 16, based on the calculated throttle opening angle $\theta$th and vehicle running speed "v", according to a predetermined relationship among these three parameters. This relationship is determined so as to assure sufficient drivability of the vehicle with a minimum fuel consumption by the engine 10. For instance, the relationship is determined so that a currently required output of the engine 10 represented by the throttle opening angle $\theta$th is obtained on an ideal v-Nin* curve which permits a minimum fuel consumption by the engine 10. Namely, the target engine speed Nin* (desired speed of the input shaft 38 of the CVT 16) is determined by the vehicle running speed "v" and the throttle opening angle $\theta$th, and according to the predetermined relationship. Eventually, the target speed ratio "e*" to obtain the determined target engine speed Nin* is determined. The predetermined relationship is stored in the ROM, in the form of a functional formula or data map. In the present embodiment, a plurality of such relationships are stored in the ROM and are selectively used depending upon the currently selected operating position (D or S) of the shift lever 252.

Subsequently, th control flow goes to steps S4, S4a, S5 and S5a, to limit the currently determined target speed ratio "e*" (determined in step S3) to a predetermined upper limit "$e_{max}$" or a predetermined lower limit "$e_{min}$", if the determined target speed ratio "e*" does not fall within a predetermined permissible control range in which the speed ratio "e" is changed. Described more particularly, step S4 is executed to determine whether the currently determined target speed ratio "e*" exceeds the upper limit "$e_{max}$" of the predetermined permissible control range, or not. If the determined target speed ratio "e*" exceeds the upper limit, the control flow goes to step S4a in which the determined target speed ratio "e*" is replaced by the upper limit or maximum value "$e_{max}$". If a negative decision (NO) is obtained in step S4, however, that is, if the currently determined target speed ratio "e*" is below the upper limit "$e_{max}$", step S5 is executed to determine whether the current target speed ratio "e*" is smaller than the lower limit "$e_{min}$" of the permissible control range, or not. If the currently determined target speed ratio "e*" is below the lower limit, the control flow goes to step S5a in which the currently determined target speed ratio "e*" is replaced by the lower limit "$e_{min}$". If the current target speed ratio "e*" is not smaller than the lower limit, this means that the speed ratio "e*" falls within the predetermined permissible control range. In this case, step S5 is followed by step S6. It follows from the above explanation that step S3 corresponds to means for determining the target speed ratio "e*" of the CVT 16, while steps S4, S4a, S5 and S5a correspond to means for limiting the currently determined target speed ratio "e*" to the predetermined upper and lower control limits "$e_{max}$" and "$e_{min}$", if the determined target speed ratio "e*" does not fall within the permissible range defined by the upper and lower control limits. In other words, the steps S4, S4a, S5 and S5a correspond to means for limiting the value of a drive signal which is applied to the CVT shift control valve device 260 based on the determined target speed ratio "e*". The drive signal is limited in order to prevent the valve device 260 from continuously operating the hydraulic cylinders 70, 72 even after the actual speed ratio "e" of the CVT 16 reaches the upper or lower limit of a mechanically defined range in which the speed ratio "e" can be varied. The predetermined permissible control range of the target speed ratio "e*" is slightly narrower than the mechanically defined range, which is determined by a maximum amount of change of the width of the V-groove of the variable-diameter pulleys 56, 58, i.e., determined by a maximum distance of movement of the movable rotors 66, 68 of the pulleys 56, 58. Namely, the permissible control range of the target speed ratio "e*" falls within the mechanically defined range of the speed ratio "e". Thus, the instant control arrangement prevents the CVT shift control valve device 260 from continuously commanding the hydraulic cylinders 70, 72 after the maximum width of the V-groove of the pulleys 56, 58 is reached or after the maximum distance of movement of the movable rotors 66, 68 is reached.

Then, the control flow goes to step S6 to calculate a speed-ratio control error, i.e., a difference ("e*"—"e") between the target speed ratio "e*" (as determined in step S3, or as limited in step S4a or S5a) and the actual speed ratio "e" (as calculated in step S2). Step S6 is followed by step S7 to determine whether the calculated speed-ratio control error ("e*"—"e") is a positive value or not. The control flow then goes to step S7a or S7b depending upon a result of the determination in step S7, in order to change the actual speed ratio "e" of the CVT 16 so a to zero the control error ("e*"—"e"). Described more specifically, if a positive decision (YES) is obtained in step S7, step S7a is executed to turn on the first solenoid valve 272 and thereby shift up the CVT 16 to increase its actual speed ratio "e". If a negative decision (NO) is obtained in step S5, step S5b is implemented to turn off the first solenoid valve 272 and thereby shift down the CVT 16 to decrease the actual speed ratio "e".

Subsequently, the control flow goes to step S8 in which a flow control valve Vo for controlling the second solenoid valve 290 is determined, for example, according to the following equation (3):

$$Vo = k \cdot |e^* - e|/e \ldots \quad (3)$$

It will be understood from the above description that steps S6, S7, S7a, S7b and S8 correspond to means for controlling the speed ratio "e" of the CVT 16 such that the actual speed ratio "e" coincides with the determined target speed ratio "e*", which may be the predetermined upper or lower limit "$e_{max}$", "$e_{min}$" of the permissible control range of the target speed ratio "e*".

In the following step S9, a drive signal represented by the determined flow control value Vo is applied to the second solenoid valve 290. For example, this drive signal is an ON/OFF signal for continuously changing the duty cycle of the second solenoid valve 290 at a predetermined frequency. With the above-indicated steps repeatedly executed, the actual speed ratio "e" of the CVT 16 is maintained at an optimum value depending upon the running condition of the vehicle.

While the control operation for the lock-up clutch 36 is not illustrated, the control unit 350 is adaped to operate the lock-up clutch 36 to the engaged position when the vehicle running speed "v" reaches a predetermined value, for instance, 30 Km/h.

In the instant hydraulic control device which has been described, the target speed ratio "e*" of the CVT 16 which is used in step S7 is limited to the predetermined maximum or minimum value "$e_{max}$" or "$e_{min}$" by execution of steps S4, S4a, S5 and S5a if the determined target speed ratio "e*" is larger or smaller than the predetermined maximum or minimum value, so that the target speed ratio "e*" always falls within a predetermined permissible control range defined by the upper and lower control limits "$e_{max}$" and "$e_{min}$". Consequently, the drive signal to be applied to the CVT shift control valve device 260 based on the determined target speed ratio "e*" is limited so that the actual speed ratio "e" of the CVT 16 does not reach the upper or lower limit of the mechanically defined or determined range in which the speed ratio "e" can be varied. This control arrangement therefore prevents an unnecessary increase of the pressure Pin or Pout in the hydraulic cylinder 70, 72, which would occur if the hydraulic cylinder 70, 72 is continuously commanded to operate even after the speed ratio "e" of the CVT 16 reaches the upper or lower limit of the mechanically defined range. Accordingly, the instant arrangement is effective to prevent deterioration of the transmission belt 60 and a hydraulic power loss of the oil pump 74, which would arise due to such an unnecessarily high pressure applied to the hydraulic cylinder 70, 72.

If the speed ratio "e" of the CVT 16 reaches the upper limit of the mechanically defined range, in particular, the first line pressure PL1 rises extraordinarily due to the feedback pressure, since the first pressure regulating valve 100 is adapted to operate based on the pressure Pin of the input side hydraulic cylinder 70 and the second line pressure PL2 (almost equal to the pressure Pout of the output side hydraulic cylinder 72), such that the first line pressure PL1 is higher than the higher one of the pressure Pin and PL2, by a predetermined extra amount. However, the instant hydraulic control device does not suffer from such an extraordinary rise of the first line pressure PL1, because of the above-indicated provisions for preventing the speed ratio "e" from reaching the upper or lower limit of the mechanically defined range.

There will be described some modified embodiments of the present invention, by reference to FIGS. 16-20. In these figures, the same reference numerals as used in the preceding embodiment will be used to identify the corresponding components.

Figure 16:
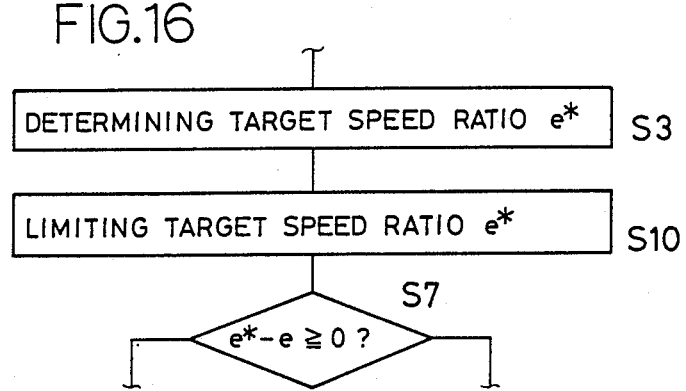
FIG. 16 is a flow chart illustrating an part of n operation of the electronic control unit used in a modified embodiment of the invention.

In a modified embodiment shown in FIG. 16, step 10 which corresponds to steps S4, S4a, S5 and S5a is provided between steps S3 and S7. In this step S10, the target speed ratio "e*" determined in step S3 is limited to within a predetermined permissible control range. That is, the target speed ratio "e*" to be used in step S7 is determined based on the target speed ratio value "e*" determined in step S3, according to a predetermined relationship a shown in FIG. 17, which relationship is represented by a function or data map stored in the ROM of the electronic control unit 350.

Figure 18:
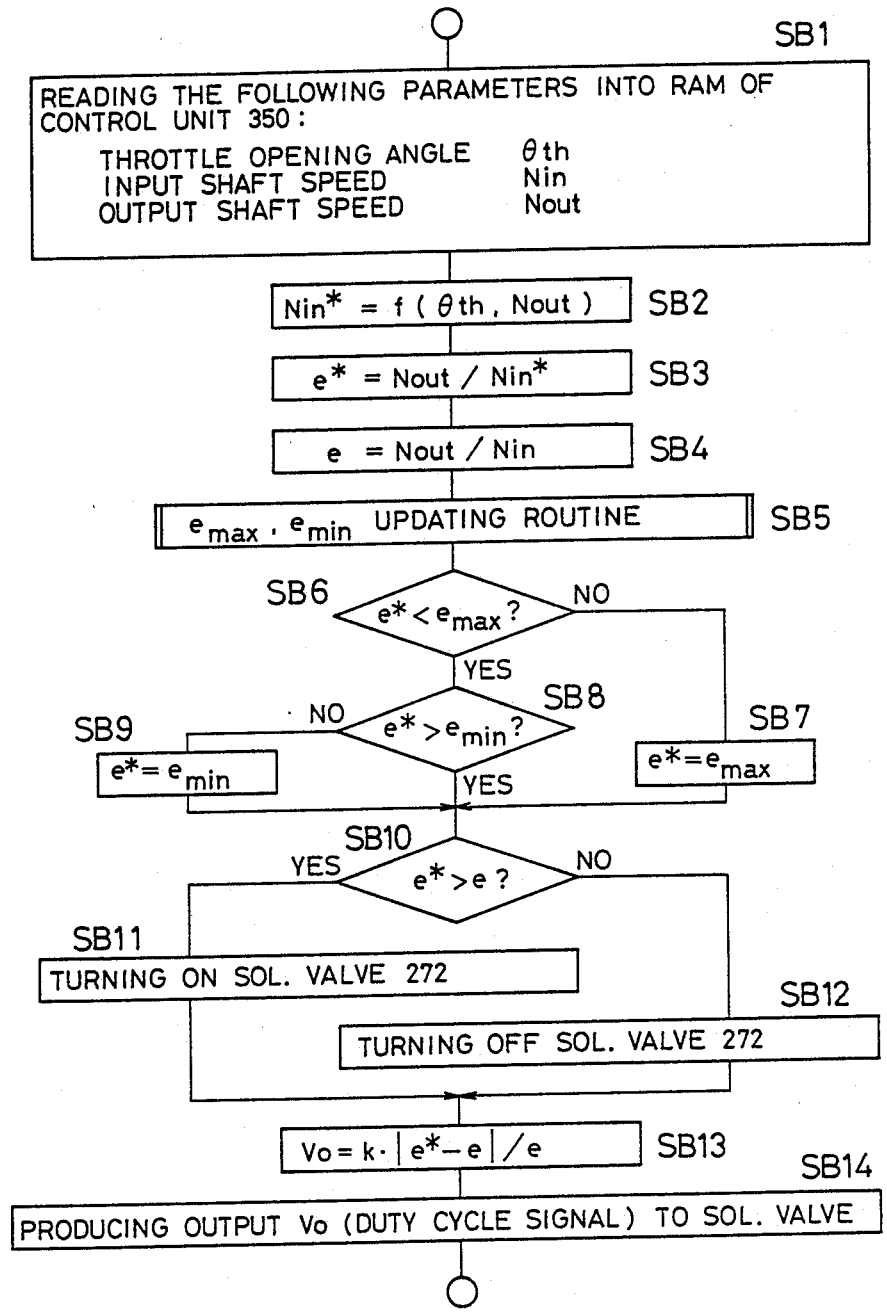
FIG. 18 is a view corresponding to that of FIG. 15, showing another modified embodiment of the invention.

Further, the electronic control unit 350 may be adapted to control the CVT 16 according to a control program indicated by a flow chart illustrated in FIG. 18. According to this control program, the control flow first goes to step SB1 similar to step S1 of FIG. 15 of the preceding embodiment. Step S1 is followed by step SB2 in which a target engine speed Nin* (target speed Nin* of the input shaft 38) is determined based on the throttle opening angle θth and the speed Nout of the output shaft 54 corresponding to the vehicle running speed v, according to a relationship among these parameters Nin*, θth and Nout, which relationship is determined so as to assure minimum fuel consumption of the engine 10 and maximum drivability of the vehicle. For instance, the relationship is determined such that a currently required output of the engine 10 is obtained on a minimum fuel consumption curve of the engine. Namely, the desired or target engine speed Nin* is determined based on the currently required output of the engine 10 (in the form of the current opening angle of the throttle valve) and on the vehicle running speed v (in the form of the output speed Nout of the output shaft 54 of the CVT 16). The control flow then goes to step SB3 in which the target speed ratio "e*" of the CVT 16 is determined so as to realize the determined target engine speed Nin*. The ROM of the control unit 350 stores a plurality of relationships as indicated above, in the form of functional equations or data maps. The appropriate relationshp is selected depending upon the currently selected position (D, S) of the shift lever 252.

In the next step SB4, the actual speed ratio "e" (=Nout/Nin) of the CVT 16 is calculated from the values Nout and Nin which were obtained in step SB1. Then, the control flow goes to step SB5 in which a speed-ratio-limit updating routine is implemented, to detect the upper and lower limits of a mechanically determined or defined range of the speed ratio "e", and determine from the detected upper and lower limits, a control range of the speed ratio "3" which is slightly narrower than the mechanically defined range of the speed ratio.

Figure 19:
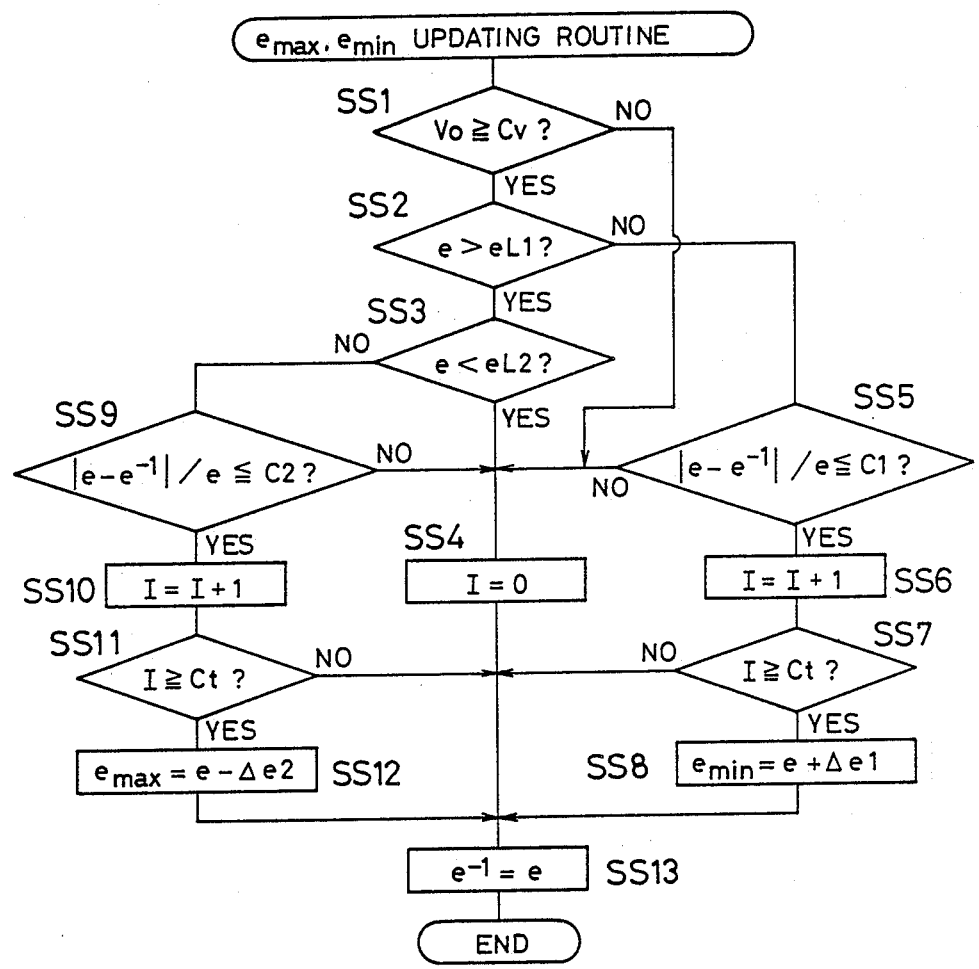
FIG. 19 is a flow chart illustrating a routine for updating control upper and lower limits of the speed ratio of the transmission.

As illustrated in FIG. 19, the speed-ratio-limit updating routine is started with step SS1 to determine whether the control value Vo indicative of the drive signal applied to the second solenoid valve 290 of the flow control valve 264 of the CVT shift control valve device 260 is equal to or larger than a predetermined reference value Cv. The control value Vo represents the dutt cycle of the solenoid valve 290, i.e., a rate of flow of the fluid through the flow control valve 264. It is noted that a comparatively high rate of flow of the fluid into one of the hydralic cylinders 70, 72 or from the other cylinder is an indication that the actual speed ratio "e" is positively changed by the hydraulic cylinders 70, 72. That is, the determination in step SS1 is intended to check if the rate of flow of the fluid exceeds a given value which corresponds to the reference value Cv. In other words, step SS1 is implemented to determine whether the CVT shift control valve device 260 is commanding the CVT 16 to change its speed ratio "e", or not. If it is determined in step SS1 that the control value Vo is smaller than the reference value Cv, step SS1 is followed by step SS4, because it is not necessary to limit the determined target speed ratio "e*" since the control value Vo to change the speed ratio "e" is not so large. In step SS4, a time counter I is cleared or zeroed. Step SS4 is followed by step SS13 in which the currently calculated speed ratio "e" obtained in step SB4 is stored in the RAM of the control unit 350, for use in the next control cycle as the last speed ratio "$e^{-1}$". Namely, the stored speed ratio "e" is updated in step SS13.

If it is found in step SS1 that the control value Vo is equal to or larger than the predetermined reference value Cv, steps SS2 and SS3 are implemented to determine whether the actual speed ratio "e" is larger than a lower-limit reference value eL1 which is slightly larger than the lower limit of the mechanically defined range of the speed ratio "e" of the CVT 16, and whether the actual speed ratio "e" is smaller than an upper-limit reference value eL2 which is slightly smaller than the upper limit of the mechanically defined range of the speed ratio "e". If an affirmative decision (YES) is obtained in both of the steps SS2 and SS3, the above-indicated steps SS4 and SS13 are executed since it is not necessary to limit the target speed ratio "e*". If a negative decision (NO) is obtained in step SS2 or SS3, this means that the speed ration "e" is close to the upper or lower limit of the mechanically defined range. In this case, the control flow goes to step SS5 or SS9, to limit the determined target speed ratio "e*".

For example, if the negative decision is obtained in step SS2, the control flow goes to step SS5 in which a difference ($|e-e^{-1}|$) between the current and last speed ratios "e" and "$e^{-1}$", divided by the current speed ratio "e", that is, a rate of change of the speed ratio ($|e-e^{-1}|$)/e is equal to or smaller than a predetermined reference value C1. If the rate of change is not equal to or not smaller than the reference value C1, this means that the speed ratio is changing at a relatively high rate. In this case, the control flow goes to steps SS4 and SS13. If the rate of change is equal to or smaller than the reference value C1, this means that the speed ratio is changing at a rate which is lower than that in a normal shifting operation of the CVT 16. In other words, the current speed ratio "e" is almost equal to the lower limit of the mechanically defined range of the CVT 16, and the mechanical movement of the CVT 16 is substantially inhibited. In this case, therefore, the control flow goes to step SS6 to increment the time counter I, and to step SS7 to determine whether the content of the time counter I is equal to or larger than a predetermined value Ct. The values C1 and Ct are respectively a rate and a time which would not be met in a normal shifting operation of the CVT 16.

If an affirmative decision (YES) is eventually obtained in step SS7 after repeated execution of steps SS1, SS2, SS5, SS6, SS7 and SS13, this means that the actual speed ratio "e" is almost equal to the lower limit of the mechanically defined range, and that the rate of change of the speed ratio is lower than usual and the change continues for a longer time than usual. In this case, it is determined that the lower limit of the mechanically defined range of the speed ratio "e" is reached. Consequently, the control flow goes to step SS8 wherein a lower control limit "$e_{min}$" is determined by adding an extra amount $\Delta el$ to the current speed ratio "e".

On the other hand, if the negative decision (NO) is obtained in step SS3, the control flow goes to step SS9 to determine whether the speed ratio difference ($|e--e^{-1}|$) divided by the current speed ratio "e", i.e., the rate of change of the speed ratio "e" is equal to or smaller than a predetermined reference value C2. If the rate of change is not equal to or not smaller than the reference value C2, this indicates that the speed ratio "e" is changing at a comparatively high rate. Accordingly, step SS4 and step SS13 are executed. If the rate of change is equal to or smaller than the reference value C2, this indicates that the rate of change is extraordinarily low, namely, the upper limit of the mechanically defined range of the speed ratio "e" is almost reached. In this case, step SS10 is implemented to increment the time counter I, and the control flow goes to step SS11 to determine whether the content of the time counter I is equal to or larger than the predetermined reference value Ct. The reference value C2 is a rate of change of the speed ratio which would not be met while the CVT 16 is normally shifted.

If an affirmative decision (YES) is eventually obtained in step SS11 after repeated execution of steps SS1, SS2, SS3, SS9, SS10, SS11 and SS13, this means that the actual speed ratio "e" is almost equal to the upper limit of the mechanically defined range, and that the rate of change of the speed ratio is lower than usual and the change continues for longer time than usual. In this case, it is determined that the upper limit of the mechanically defined range of the speed ratio "e" is reached. Consequently, the control flow goes to step SS12 wherein an upper control limit "$e_{max}$" is determined by subtracting an extra amount $\Delta e2$ from the current speed ratio "e".

Figure 20:
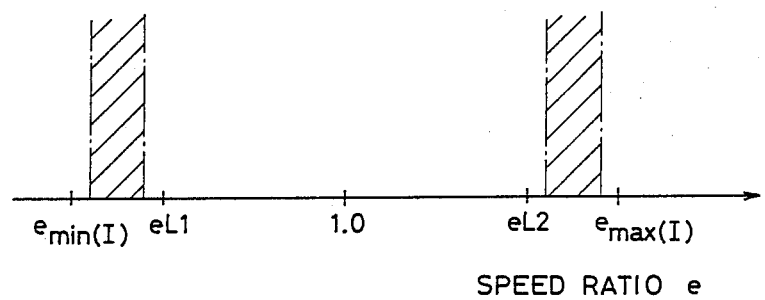
FIG. 20 is a view explaining the routine of FIG. 19.

Immediately after the electronic control unit 350 is turned on, no upper and lower control limits "$e_{max}$" and "$e_{min}$" have been determined by the speed-ratio updating routine of FIG. 19, and therefore predetermined initial control values "$e_{max(I)}$" and "$e_{min(I)}$" are used. These initial control values are determined as indicated in FIG. 20. In the figure, hatched areas indicate presumed ranges in which the upper and lower limits of the mechanically defined range of the speed ratio "e" of the CVT 16 are fluctuated due to various factors. The initial control values "$e_{max(I)}$" and "$e_{min(I)}$" are higher and lower than the upper and lower limits of the above-indicated presumed ranges of fluctuation, respectively. According to this arrangement, the CVT 16 necessarily experience shifting operations commanded to establish speed ratios above and below the mechanically fixed upper and lower limits, during an initial period of operation of the control unit 350. As indicated in FIG. 20, the lower-limit and upper-limit reference values eL1 and eL2 are determined to be larger and smaller than the lower and upper limits of the presumed ranges of fluctuation of the speed ratio "e" indicated by the hatched lines.

Since the initial values "$e_{max(I)}$" and "$e_{min(I)}$" are provided each time the control unit 350 is turned on, the upper and lower control limits "$e_{max}$" and "$e_{min}$" of the speed ratio "e" are initialized to the initial control values each time the engine ignition key of the vehicle is turned on. Because the initial control values are determined as indicated above, the initialization of the upper and lower control limits is effective when there is a tendency that the mechanically fixed upper and lower limits of the speed ratio "e" are changed in a direction that expands the range of the speed ratio, due to elongation of the transmission belt 60, for example. The upper and lower control limits may be initialized to the predetermined initial values indicated above, at a suitable time interval during an operation of the control unit 350 following each activation of the engine ignition key. This control arrangement is advantageoius where the mechanically defined range of the speed ratio of the CVT 16 tends to be expanded during a running of the vehicle following each activation of the engine ignition key.

After the speed-ratio-limit updating routine of FIG. 19 is completed in step SB5, steps SB6, SB7, SB8 and SB9 of FIG. 18 are executed to limit the target speed ratio "e*" (determined in step SB3) to the predetermined upper or lower control limit "$e_{max}$" or "$e_{min}$", if the determined target speed ratio "e*" does not fall within a predetermined permissible control range defined by the upper and lower control limits "$e_{max}$" and "$e_{min}$". Described more particularly, step SB6 is executed to determine whether the target speed ratio "e*" determined in step SB3 is smaller than the predetermined upper control limit "$e_{max}$", or not. If the determined target speed ratio "e*" is not smaller than the upper control limit, the control flow goes to step SB7 in which the determined target speed ratio "e*" is replaced by the upper control limit "$e_{max}$". If an affirmative decision (YES) is obtained in step SB6, however, that is, if the currently determined target speed ratio "e*" is smaller than the upper control limit "$e_{max}$", step SB8 is executed to determine whether the determined target speed ratio "e*" is larger than the predetermined lower control limit "$e_{min}$" of the permissible control range, or not. If the predetermined target speed ratio "e*" is not larger than the lower control limit, the control flow goes to step SB9 in which the determined target speed ratio "e*" is replaced by the lower control limit "$e_{min}$". If the current target speed ratio "e*" is larger than the lower control limit, this means that the speed ratio "e*" falls within the predetermined permissible control range defined by the upper and lower limits "$e_{max}$" and "$e_{min}$". In this case, step SB8 is followed by step SB10 and subsequent steps. It follows from the above description that step SB5 corresponds to means for determining the upper and lower control limits "$e_{max}$" and "$e_{min}$" of the speed ratio "e", while steps SB6–SB9 correspond to means for limiting the determined target speed ratio "e*" to the predetermined upper and lower control limits, if the determined target speed ratio "e*" does not fall within the predetermined permissible control range defined by the upper and lower control limits. In other words, the steps SB6–SB9 correspond to means for limiting a drive signal which is applied to the CVT shift control valve device 260 based on the determined target speed ratio "e*". The drive signal is limited in order to prevent the valve device 260 from continuously operating the hydraulic cylinders 70, 72 even after the actual speed ratio "e" of the CVT 16 reaches the upper or lower limit of the mechanically defined range in which the speed ratio "e" can be varied.

In step SB10, the control unit 350 determines whether the target speed ratio "e*" determined in step SB3 is larger than the actual speed ratio "e" calculated in step SB4, or not. Then, the control flow goes to step SB11 or SB12, depending upon a result of the determination in step S10, in order to change the actual speed ratio "e" of the CVT 16 so as to zero the control error ("e*"−"e"). Namely, if the determined target speed ratio "e*" is larger than the actual speed ratio "e", the control flow goes to step SB11 in which the first solenoid valve 272 is energized to shift up the CVT 16 to increase its actual speed ratio "e". If the target speed ratio "e*" is smaller than the actual speed ratio "e", the control flow goes to step SB12 in which the second solenoid valve 272 is deenergized to shift down the CVT 16 to decrease the actual speed ratio "e".

Subsequently, the control flow goes to step SB13 in which a control error (|"e*"−"e"|) between the target and actual speed ratios is calculated, and a flow control value Vo for controlling the second solenoid valve 290 is determined based on the calculated control error, and according to the equation (3) given above.

In the following step SB14, a drive signal represented by the determined flow control value Vo is applied to the second solenoid valve 290. For example, this drive signal is an ON/OFF signal for continuously changing the duty cycle of the second solenoid valve 290 at a predetermined frequency. With the above-indicated steps repeatedly executed, the actual speed ratio "e" of the CVT 16 is maintained at an optimum value depending upon the running condition of the vehicle.

It will be understood from the foregoing description that the present modified embodiment is adapted to execute the speed-ratio-limit updating routine of FIG. 19 in which the normally updated upper and lower control limits "$e_{max}$" and "$e_{min}$" define a permissible range of the target speed ratio "$e*$" which is slightly narrower, by the predetermined extra amounts $\Delta e1$ and $\Delta e2f$, than the mechanically determined or defined range which corresponds to the maximum amount of change of the width of the V-groove of the variable-diameter pulley 56, 58 or the maximum distance of movement of the movable rotor 66, 68 of the pulley 56, 58. According to the instant control arrangement, the target speed ratio "$e*$" always falls within the permissible range defined by the upper and lower control limits "$e_{max}$" and "$e_{min}$". In other words, the drive signal to be applied to the CVT shift control valve device 260 is controlled such that the actual speed ratio "e" will not be changed beyond the permissible range between the upper and lower control limits, whereby the movable rotor 66 or 68 will not be moved to the extreme stroke ends. Namely, the actual speed ratio "e" will not reach the upper limit ("$e_{max}$"+$\Delta e2$) or lower limit ("$e_{min}$"--$\Delta e1$) of the mechanically defined range. If the hydraulic cylinders 70, 72 are operated so as to establish the upper or lower limit of the mechanically defined range of the speed ratio, the pressure Pin or Pout in the cylinder 70, 72 will rise to an unnecessarily high level, and the transmission belt 60 tends to be deteriorated and the oil pump 74 tends to suffer from an increased power loss.

Further, the upper and lower limits ("$e_{max}$"+$\Delta e2$), ("$e_{min}$"−$\Delta e1$) of the mechanically defined range of the speed ratio "e" of the CVT 16 can be detected by execution of the speed-ratio-limit updating routine of FIG. 19. Accordingly, the actual speed ratio "e" can be changed to points close to the upper and lower limits of the mechanically defined range, and therefore the actual speed ratio "e" can be varied over a relatively wide range almost equal to the entire mechanically defined range, even if the mechanically defined range is expanded during a long period of use of the CVT 16, or even if the mechanically defined range differs from one CVT 16 to another. The range in which the speed ratio "e" is permitted to be changed would be narrow if the upper and lower control limits were determined so as to define a considerably narrow permissible control range in order to prevent the actual speed ratio "e" from reaching the upper and lower limits of the mechanically defined range, which may differ on the individual CVTs or which may be changed during use of the transmission.

The first pressure regulating valve 100 is adapted to operate based on the pressure Pin of the input side hydraulic cylinder 70 and the second line pressure PL2 (almost equal to the pressure Pout of the output side hydraulic cylinder 72), such that the first line pressure PL1 is higher than the higher one of the pressures Pin and PL2, by a predetermined extra amount. Therefore, if the speed ratio "e" of the CVT 16 reaches the upper limit of the mechanically defined range, the first line pressure PL1 rises to an unnecessarily high level due to the feedback pressure applied to the first pressure regulating valve 100. However, the instant hydraulic control device does not suffer from such an unnecessary rise of the first line pressure PL1, because of the above-indicated provisions for preventing the speed ratio "e" from reaching the upper or lower limit of the mechanically defined range.

While the present invention has been described in its presently preferred embodiments, it is to be understood that the invention may be otherwise embodied.

For example, the feedback control in the illustrated embodiments so as to zero the control error ("$e*$"−"e") may be replaced by an open-loop control in which no feedback signal is applied to the CVT shift control valve device 260. In this case, too, the principle of the present invention may be practiced for limiting or modifying the drive signal applied to the control valve device 260, so as to prevent the actual speed ratio "e" of the CVT 16 from reaching the upper or lower limit of the mechanically defined range.

In the illustrated embodiments, the speed ratio "e" of the CVT 16 is controlled by the CVT shift control valve device 260, such that the fluid in one of the first and second pressure lines is supplied to one of the two hydraulic cylinders 70, 72 while the fluid in the other hydraulic cylinder 70, 72 is discharged into the other pressure line. Howwever, the present invention is applicable to a hydraulic control device wherein a line pressure is always applied to the output side hydraulic cylinder 72 for controlling the tension of the transmission belt 60 while supply and discharge flows of the fluid into and from the input side hydraulic cylinder 70 are controlled by a flow control valve so as to change the speed ratio of the CVT 16.

While the illustrated embodiments are adapted such that the target speed ratio "$e*$" determined in step S3 of FIG. 15 or 16 or SB3 of FIG. 18 is limited so as to fall within a predetermined permissible control range defined by upper and lower limits, the determined target speed ratio "$e*$" may be limited only if the determined target speed ratio "$e*$" exceeds a predetermined upper control limit, or alternatively only if the determined target speed ratio is below a predetermined lower control limit.

In the illustrated embodiments, the speed ratio "e" of the CVT 16 is controlled such that the actual speed ratio "e" coincides with the determined target speed ratio "$e*$", it is possible to control the actual speed ratio "e" such that the actual speed Nin of the input shaft 38 of the CVT 16 coincides with a determined target speed Nin* (=Nout/$e*$) of the input shaft 38. In this instance, the determined target speed Nin* is limited so as to fall within a predetermined permissible control range defined by upper and lower control limits "$N_{max}$" and "$N_{min}$". This permissible control range of the target speed Nin* is determined so that the actual speed ratio "e" of the CVT 16 is variable over a range which is slightly narrower than the mechanically defined or determined range.

Figure 17:
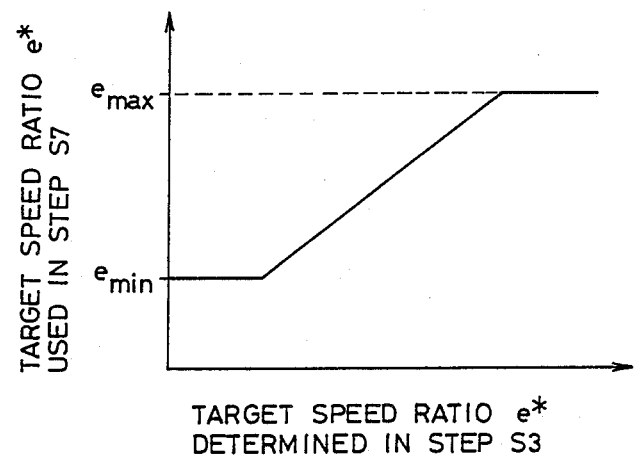
FIG. 17 is a graph indicating a relationship used in the embodiment of FIG. 16.

While the target speed ratio "$e*$" is once determined in step S3 of FIG. 15 or 16 before the determined target speed ratio "$e*$" is limited in the subsequent step (S10 of FIG. 16) or steps (S4, S4a, S5, S5a of FIG. 15), it is possible that limited target speed ratios "$e_{max}$" and "$e_{min}$" may be obtained in step S3 according to a relationship similar to that of FIG. 17. In this case, the target speed ratio "$e*$" used in step S7 is determined in step S3 directly from the throttle opening angle and the vehicle running speed.

While the second pressure regulating valve 100 of the illustrated embodiments is operated by hydraulic pressures, it may be a pressure control servo valve which is controlled by the electronic control unit 350.

While the THROTTLE pressure Pth produced by the throttle-opening sensing valve 180 is used as a pressure representative of the currently required output of the engine 10, this hydraulic signal Pth may be replaced by other hydraulic signals provided that the signals represent or closely relates to the output torque of the engine 10. For instance, it is possible to use a hydraulic pressure representative of the vacuum or reduced pressure in the suction pipe of the engine as sensed by a suitable sensor, or a hydraulic pressure representative of the operating amount of an accelerator pedal of the vehicle. In the latter case, the cam 184 used in the illustrated embodiments is mechanically linked with the accelerator pedal, such that the cam 184 is rotated with an increase in the operating amount of the pedal.

Further, the pilot pressure $P_p$ generated by the pilot pressure control valve 266 may be replaced by the fourth line pressure PL4. In this case, the valve 266 is eliminated, and the cost of the hydraulic control device is accordingly lowered.

In the illustrated embodiments, the switch valve 170 is adapted to apply to the first pressure regulating valve 100 the higher one of the pressure Pin in the input side hydraulic cylinder 70 and the second line pressure PL2. However, the pressure Pout in the output side hydraulic cylinder 72 may be used in place of the second line pressure PL2. In this case, the pressure Pout is applied to the second port 316 of the switch valve 170 through the output side passage 306.

Although the auxiliary transmission 14 is disposed between the fluid coupling 12 and the input shaft 38 of the CVT 16, the auxiliary transmission 14 may be disposed between the output shaft 54 of the CVT 16 and the intermediate gear device 18.

The auxiliary transmission 14 may be modified to have a plurality of forward drive positions, rather than a single forward drive position provided in the illustrated embodiments.

The fluid coupling 12 may be replaced by an electromagnetic clutch, wet-type clutch or other types of couplings.

It will be understood that the preferred embodiments of the invention and the modifications thereof which have been described above are provided for illustrative purpose, but the present invention may be embodied with various other changes and modifications, which may occur without departing from the spirit and scope of the invention defined in the following claims.

What is claimed is:

1. A hydraulic control device for controlling a belt-and-pulley type continuously variable transmission for an automotive vehicle which includes an input and output shaft, a pair of variable-diameter pulleys provided on the input and output shafts, respectively, a transmission belt connecting the pair of pulleys, and a pair of hydraulic actuators for changing effective diameters of the variable-diameter pulleys, said hydraulic control device comprising:

a shift control valve device for controlling pressures applied to said hydraulic actuators, to change an actual speed ratio of the continuously variable transmission over a mechanically defined range; and control means for applying a drive signal to said shift control valve device;

said control means including limiting means for limiting a value of said drive signal, so as to prevent said actual speed ratio of the transmission from reaching upper and lower limits of said mechanically defined range.

2. A hydraulic control device according to claim 1, wherein said control means further includes speed-ratio control means for controlling said actual speed ratio of the transmission such that the actual speed ratio or an actual speed of said input shaft coincides with a target value, and determining means for determining said target value according to a predetermined relationship, said limiting means limiting the determined target value to an upper or lower control limit of a predetermined permissible control range of the target value, if said determined target value is higher than said upper control limit or lower than said lower control limit.

3. A hydraulic control device according to claim 1, further comprising a hydraulically operated pressure regulating valve which adjusts a line pressure based on a higher one of pressures in said pair of hydraulic actuators.

4. A hydraulic control device according to claim 1, further comprising a pressure regulating servo valve which is electrically controlled based on a signal representative of a control error between said actual speedd ratio and a target speed ratio of said transmission.

5. A hydraulic cntrol device according to claim 1, wherein said control means further includes detecting means for detecting said upper and lower limits of said mechanically defined range of the actual speed ratio of said transmission.

6. A hydraulic control device according to claim 5, wherein said detecting means determines said upper and lower limits of said mechanically defined range of the speed ratio of the transmission, when a rate of change of said actual speed ratio is lower than a predetermined reference value while a value of said drive signal is larger than a predetermined value.

7. A hydraulic control device according to claim 5, wherein said control means controls said shift control device such that said actual speed ratio of said transmission coincides with a determined target speed ratio, and said limiting means limits the determined target speed ratio such that said determined target speed ratio is held within a permissible control range which is predetermined based on said upper and lower limits of said mechanically defined range which is detected by said detecting means.

8. A hydraulic control device according to claim 5, wherein said control means controls said shift control valve device such that an actual speed of said input shaft of said transmission coincides with a determined target speed, and said limiting means limits the determined target speed such that said determined target speed is held within a permissible control range which is predetermined based on said upper and lower limits of said mechanically defined range which is detected by said detecting means.

* * * * *